(12) United States Patent
Dash et al.

(10) Patent No.: US 9,178,422 B2
(45) Date of Patent: Nov. 3, 2015

(54) RESONANCE-BASED SINGLE INDUCTOR OUTPUT-DRIVEN DC-DC CONVERTER AND METHOD

(71) Applicant: Texas Instruments Incorporated, Dallas, TX (US)

(72) Inventors: Ranjit K. Dash, Karnataka (IN); Keith E. Kunz, Bryan, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 227 days.

(21) Appl. No.: 14/035,290

(22) Filed: Sep. 24, 2013

(65) Prior Publication Data

US 2014/0232359 A1  Aug. 21, 2014

Related U.S. Application Data

(60) Provisional application No. 61/767,474, filed on Feb. 21, 2013.

(51) Int. Cl.
*H02M 3/158* (2006.01)
*H02M 1/00* (2007.01)

(52) U.S. Cl.
CPC ........ H02M 3/158 (2013.01); *H02M 2001/009* (2013.01); *H02M 2001/0058* (2013.01); *Y02B 70/1425* (2013.01); *Y02B 70/1491* (2013.01)

(58) Field of Classification Search
CPC ................... H02M 3/1588; H02M 2001/0045; H02M 3/1584; H02M 3/156; G05F 3/24
USPC .................. 323/265, 268, 271, 272, 282, 351
See application file for complete search history.

(56) References Cited

U.S. PATENT DOCUMENTS 5,825,103 A * 10/1998 Lee ............................... 307/130
6,323,627 B1 * 11/2001 Schmiederer et al. ........ 323/222

(Continued)

OTHER PUBLICATIONS

Jabbari, M., et al., "Family of Soft-Switching Resonant DC-DC Converters," IET Power Electron, vol. 2, Iss. 2, pp. 113-124, 2009.
Shahalami, S.H., "Simulation and Implementation of a New Topology in Multi-Output DC-DC Resonant Converters Based on SwRC Converters," 2011 2nd Power Electronics, Drive Systems and Technologies Conference.

(Continued)

*Primary Examiner* — Adolf Berhane
(74) *Attorney, Agent, or Firm* — John R. Pessetto; Frank D. Cimino

(57) ABSTRACT

A resonance-based DC-DC converter for converting a DC input voltage to a first DC output voltage ($V_{OUT1}$) on a output conductor (9) includes an inductor (L) having a first terminal connected to a source (2) of a DC input voltage ($V_{IN}$) and a second terminal coupled to a first conductor (4) and a capacitor ($C_{RES}$) having a first terminal coupled to the first conductor. A first switch (SW1) is coupled between the resonance conductor and the output conductor to conduct inductor current ($I_L$) into the output conductor during a first phase (Phase1). A second switch (SW2) is coupled between a second terminal of the capacitor and the output conductor to conduct inductor current through the capacitor into the output conductor (9) during a second phase (Phase2). A third switch (SW3) is coupled between the second terminal (31) of the capacitor and a first reference voltage (GND) to conduct inductor current from a source of the first reference voltage through the capacitor to the input voltage ($V_{IN}$) during a third phase (Phase3).

21 Claims, 19 Drawing Sheets

(56) References Cited

U.S. PATENT DOCUMENTS

| | | | |
|---|---|---|---|
| 8,456,144 B2* | 6/2013 | Chatroux et al. | 323/235 |
| 2009/0167285 A1* | 7/2009 | Huang et al. | 323/363 |
| 2012/0306432 A1* | 12/2012 | Xu et al. | 320/103 |
| 2015/0084607 A1* | 3/2015 | Hayami et al. | 323/271 |
| 2015/0091576 A1* | 4/2015 | Liu et al. | 324/322 |

OTHER PUBLICATIONS

Kuan, Chien-Wei, "Near-Independently Regulated 5-Output Single-Inductor DC-DC Buck Converter Delivering 1.2/mm2 in 65nm CMOS," 2012 IEEE International Solid-State Circuits Conference, Session 16, Switching Power Control Techniques.

* cited by examiner

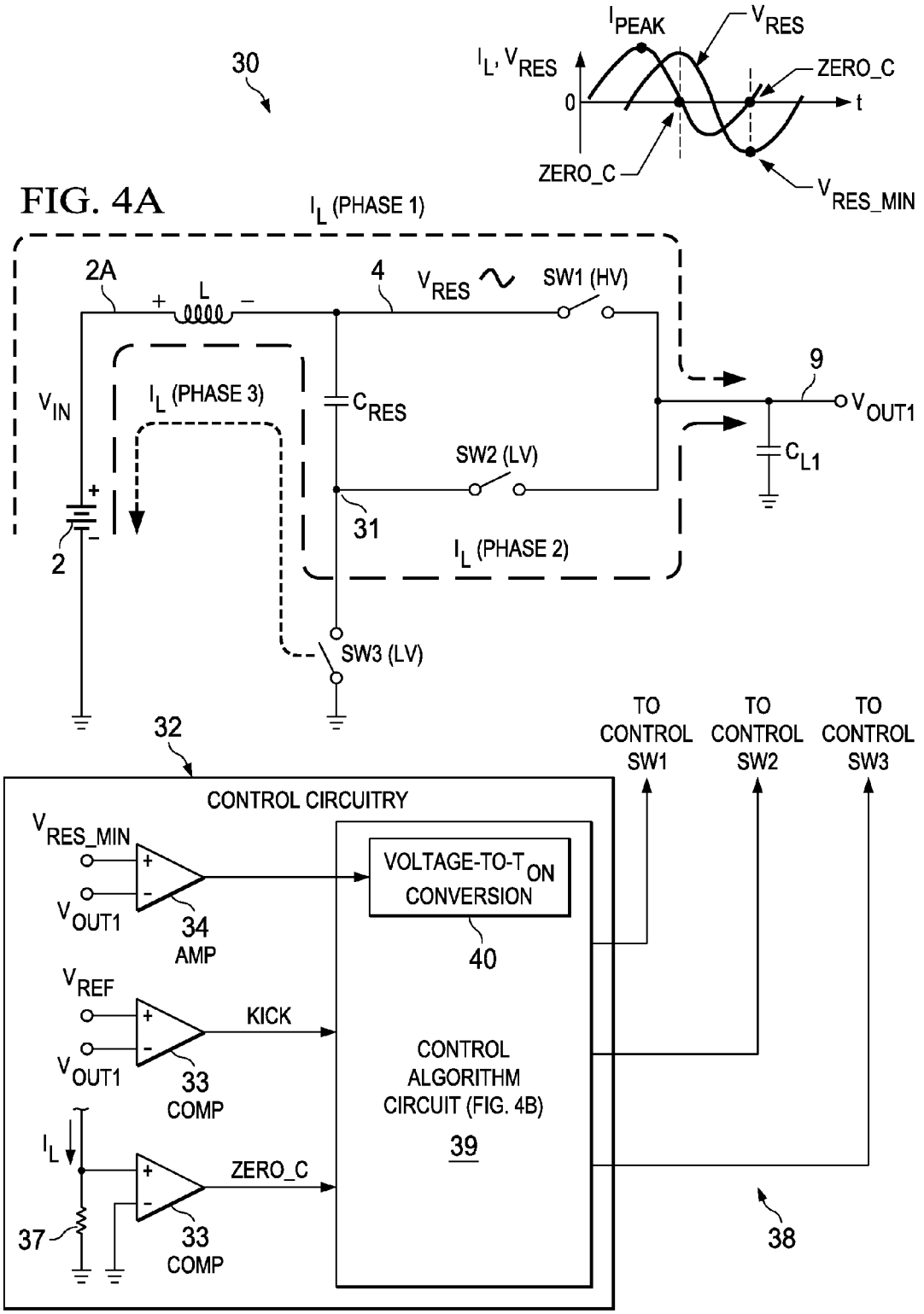

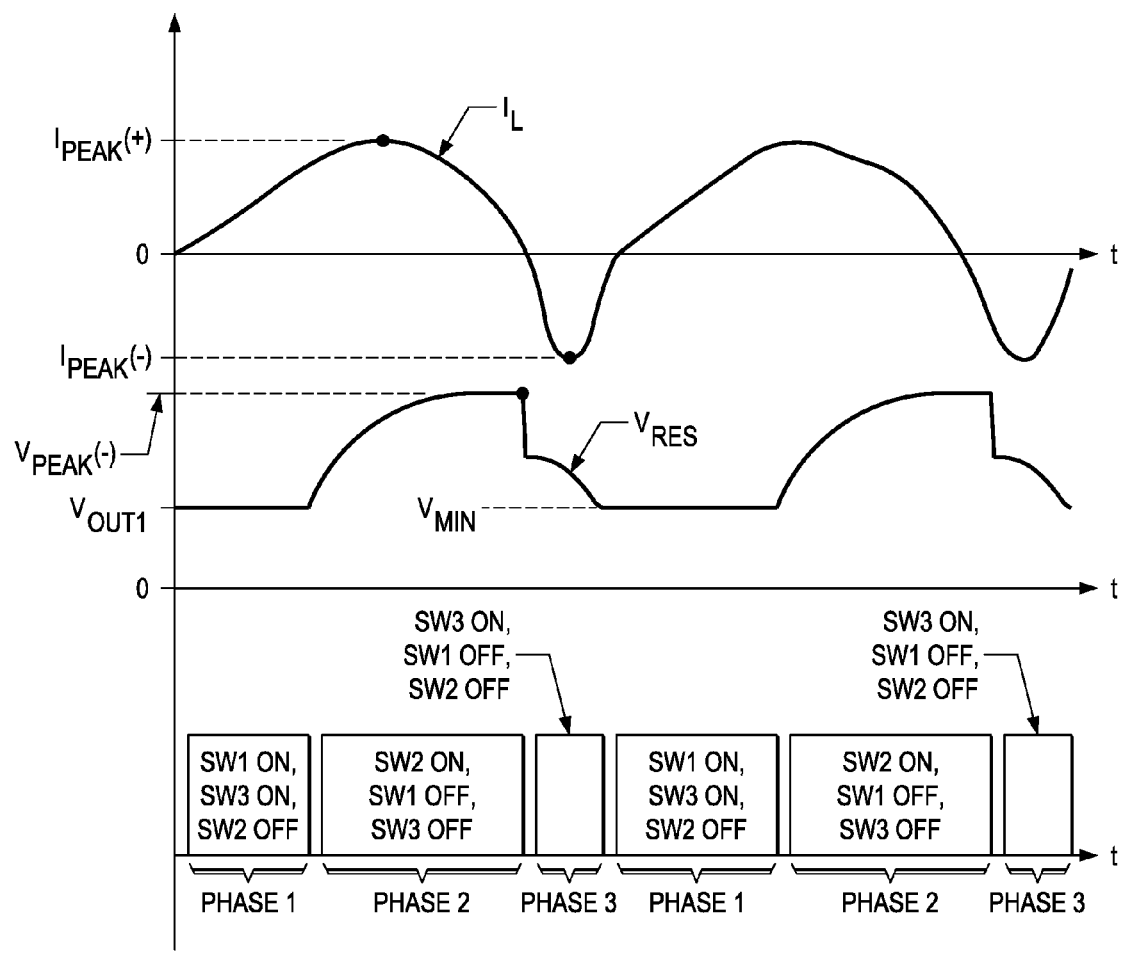

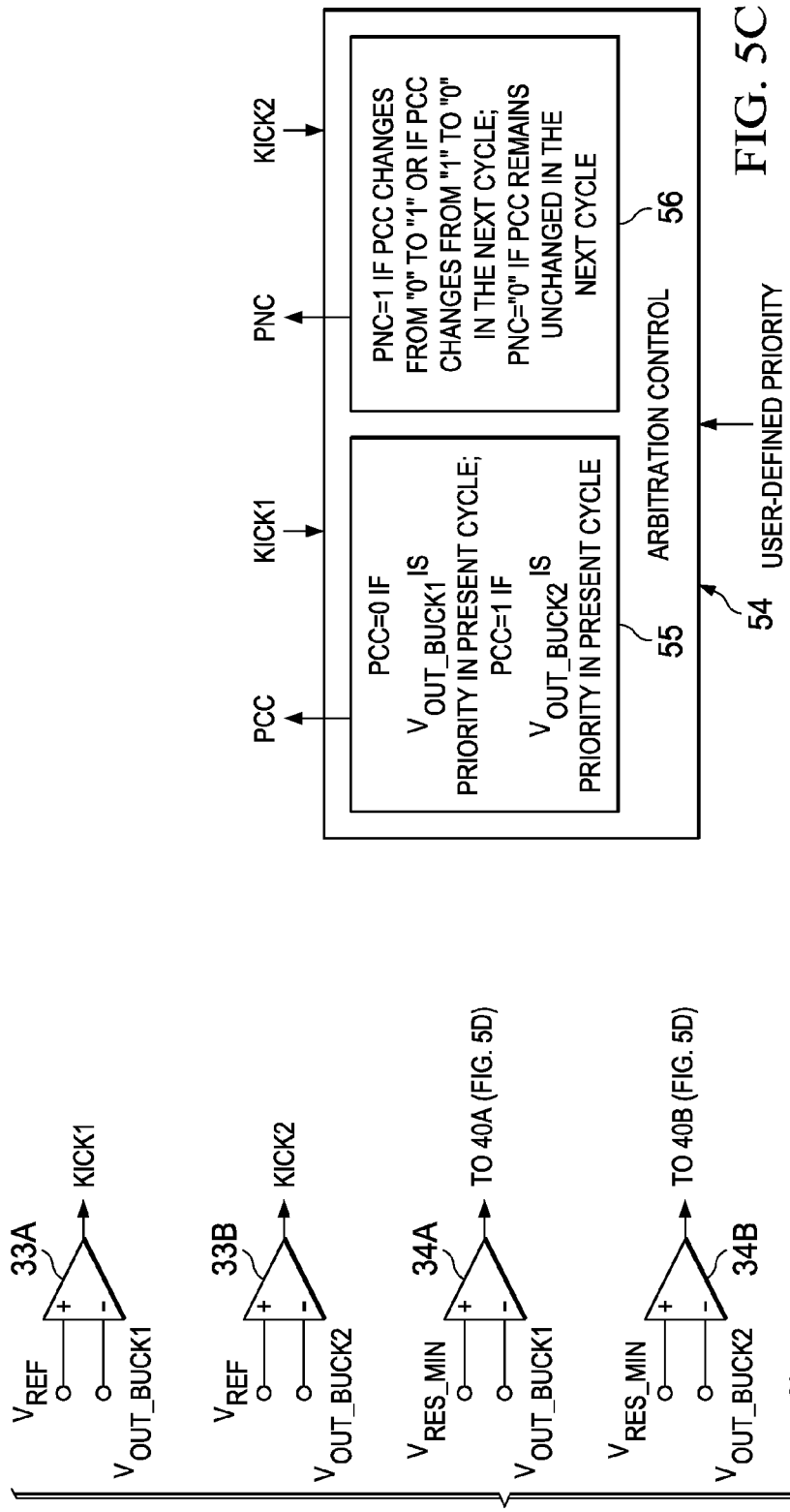

US 9,178,422 B2

RESONANCE-BASED SINGLE INDUCTOR OUTPUT-DRIVEN DC-DC CONVERTER AND METHOD

This application claims the benefit of prior filed U.S. provisional application Ser. No. 61/767,474 filed Feb. 21, 2013, entitled "Resonance-Based Single Inductor Output Driven DC-DC Converter and Method", by Ranjit Kumar Dash and Keith E. Kunz, and incorporated herein by reference.

BACKGROUND OF THE INVENTION

The present invention relates generally to DC-DC converters, and more particularly to circuitry and methods which substantially increase the conversion efficiency and reduce costs of SIMO (single inductor multiple output) DC-DC converters.

It should be understood that DC-DC converter technology has improved relatively slowly, but the advent of large, powerful computing devices on a single integrated circuit chip and the need to reduce their power consumption (especially in mobile devices) has led to the need for multiple on-chip power sources to provide a range of relatively high power supply voltages to various faster, higher-performance portions of the chip and a range of relatively low power supply voltages to various slower, lower performance portions of the chip. For example, circuitry in one part of the chip may need to operate very fast, and this may be accomplished by increasing the power supply voltage for that part of the chip while the power supply voltage or voltages are much lower on slower parts of the chip. Unfortunately, adding a large number of DC-DC converters to provide different power supply voltages in various parts of the chip usually is not practical because that has required adding a corresponding number of external inductors and capacitors and associated package leads, which is very costly.

Consequently, and as a practical matter at the present state-of-the-art, only seven or eight separate power supply voltages ordinarily are provided on a relatively large chip, and only one or two separate power supply voltage circuits are provided on a relatively small chip because of the high cost of the external inductors required for each DC-DC voltage converter. Although the cost of using larger and more complex high-performance integrated circuits that require many individually controllable DC-DC converters is very high, if the energy efficiency of the DC-DC converter circuitry could be substantially improved then the power efficiency of entire on-chip systems could be correspondingly improved.

One approach to accomplishing this goal has been to provide SIMO (Single Input, Multiple Output) DC-DC converters which require only one external inductor but nevertheless can provide multiple individually controllable power supply voltages by "sharing" the single inductor. Unfortunately, the best SIMO DC-DC converters presently available have a number of drawbacks, including lower power efficiency and higher cost than using an equivalent number of SISO (Single Input, Single Output) DC-DC converters. This is because of various complex problems associated with sharing power supply energy produced at a single output among a number of outputs.

Referring to "Prior Art" FIG. 1A, a simplified schematic of a prior SIMO (Single Inductor, Multiple Output) DC-DC converter 1 includes an input switch circuit 3A,3B receiving an input voltage $V_{IN}$, which typically is the output of a battery. An input switch 3A is connected between $V_{IN}$ and a conductor 4 which is connected to one terminal of an inductor L. Inductor L typically is an external power inductor. Also, an input switch 3B is connected between conductor 4 and ground. The other terminal of inductor L is connected to one terminal of each of multiple output switches 6-1, 6-2, . . . 6-N. The other terminals of output switches 6-1, 6-2, . . . 6-N produce output voltages $V_{OUT1, 2, \ldots 5}$ on one terminal of each of load capacitances $C_{L1, 2, \ldots N}$, respectively. Another terminal of each of load capacitances $C_{L1, 2, \ldots N}$ is connected to ground.

FIG. 1B shows a pictorial diagram of a large "charge reservoir" 2 representing battery 2 of FIG. 1A, which holds a large amount of charge. Underneath reservoir 2 is a relatively large "bucket" 7 which represents inductor L in FIG. 1A. Bucket 7 is filled precisely to capacity with charge through a controlled valve S. Bucket 7 then is sequentially passed, as indicated by reference numerals 7-1, 2 . . . N, over various smaller buckets representing output capacitors $C_{L1, 2, \ldots N}$, respectively, to precisely fill each of the smaller buckets $C_{L1, 2, \ldots N}$. However, if bucket 7 is over-filled (i.e., inductor L is overcharged), there is a loss or waste of energy. Or, if bucket 7 is under-filled (i.e., inductor L is under-charged), then at least one of the output buckets $C_{L1, 2, \ldots N}$ will not receive enough charge. The phenomenon of under-filling or under-charging the inductor and not being able to supply enough charge to each of the outputs during a given cycle is called "cross regulation", and this is a basic problem for SIMOs. (Cross regulation is defined as the change in output voltage of one output caused by a change in voltage of or current in another output. The term "load regulation" refers to change of an output due to changes in the load current delivered to or drawn by a load connected to that output.) Load regulation problems may prevent accurate voltage regulation of at least some of the output power supply voltages $V_{OUT1, 2, \ldots 5}$. The parallel horizontal dashed lines extending from bucket 7 in FIG. 1B represent an amount of intentional overcharging or undercharging of inductor L to ensure that there is enough charge/current for all of the buckets or output capacitors 7-1, 7-2 . . . 7-N.

Prior SIMO DC-DC converters have lower power efficiency than SISO DC-DC converters when the inductor L is "overcharged". There are a number of reasons why a SIMO converter has lower power efficiency than a SISO converter. One reason is the charge sharing from the single inductor to the multiple outputs, wherein the single inductor may be either overcharged or undercharged. A SIMO converter needs to deal with the sharing of charge/current from the single inductor and that reduces the DC-DC converter efficiency. Another problem of prior SIMO DC-DC converters is that they include an additional input switch that inherently reduces power efficiency, because each input switch is coupled in series between the input and the multiple outputs, respectively, of the output of the SIMO DC-DC converter. That adds both conductive power loss and switching power loss for each output switch transistor, and also increases EMI (electromagnetic interference) due to operating the various switch transistors.

Prior Art FIG. 2 is a block diagram of a SIMO DC-DC converter 10 configured as a buck converter, as shown in the article "Near-Independently Regulated 5-Output Single-Inductor DC-DC Buck Converter Delivering 1.2 W/mm² in 65 nm CMOS", by Chien-Wei Kuan and Hung-Chih Lin, pp. 274-276, 2012 IEEE International Solid-State Circuits Conference/Session 16/Switching Power Control Techniques. This SIMO DC-DC converter generally indicates the present state-of-the-art for SIMO DC-DC converters. In FIG. 2, SIMO DC-DC converter 10 includes an input switch circuit coupled by conductor 2A to receive the battery voltage $V_{BAT}$. The input switching circuitry includes P-channel input transistor MP and N-channel input switch transistor MN having their drains coupled by conductor 4 to external inductor L. SIMO DC-DC converter 10 also includes an "adaptive energy recovery control circuit 11, control circuitry 14, output switch circuit 6 including output transistors MS1, 2, ... 5, and a current sensing circuit 12. Individually controllable DC output voltages $V_{OUT1, 2, \ldots 5}$ are generated on 5 separate capacitive loads (which are each modeled as a capacitor in parallel with a current source).

Adaptive energy recovery circuit 11 includes P-channel transistor MDR having its source connected to $V_{BAT}$ and the source of input transistor MP. The drains of input transistors MP and MN are connected by conductor to one terminal of external inductor L, the other terminal of which is connected by conductor 5 to the sources of the output switch transistors MS1, 2, ... 5 and to an input of current sensing circuit 12. The drain of transistor MDR is connected to conductor 5. Switch transistor MDR provides a path from ground to the battery (not shown) which supplies $V_{IN}$, through which any excess charge/current in inductor L is returned back to the battery. Switching transistor MDR allows overcharge current in inductor L to be returned to the battery with almost no loss. Switch transistor MDR in FIG. 2 also allows deliberate overcharging of inductor L so that extra load current is available to be supplied to any of the loads, including capacitors $C_{L1, 2, \ldots 5}$ and current sources $I_{0, 1, 2 \ldots 5}$, that need additional load current. That avoids cross regulation problems because if one output load changes and "steals" too much load current, it does not occur at the expense of another output load, and any overcharge current remaining in inductor L at the end of the present cycle is returned to the battery through switch transistor MDR.

The capacitive load coupled to the drain of output switch transistor MS1 includes capacitor $C_{L1}$ and current source $I_{O1}$; the loads coupled to the drains of the remaining output switch transistors are modeled similarly. The gates of output switch transistors MS1, 2, ... 5 are coupled to the control signals $V_{S1, 2, \ldots 5}$, respectively, that are generated by block 22. Control circuit 14 includes internal voltage circuitry 15 which generates regulated voltages equal to 2.8 V and $V_{IN}$ –2.8 V from its input voltage $V_{IN}$. Control circuit 14 also includes voltage selection circuit 17, which performs the functions of generating the signals $V_{HP}$ and $V_{HN}$ which then are utilized in block 21 to set the desired level shift of voltages to be applied to the drivers in blocks 22 and 24. Control circuit 14 also includes an analog controller circuit 18 which receives the output signals $V_{OUT1, 2, \ldots 5}$, associated reference voltages $V_{REF1, 2, \ldots 5}$, current sensing output signal $I_{LSEN}$, and $V_{AR}$ which is generated by the circuitry in blocks 18 (which includes comparators), 20, and 22 in response to feedback from the outputs $V_{OUT1, 2, \ldots 5}$. The output of analog controller circuit 18 is provided as an input to switch control logic 20, the outputs of which are provided as inputs to level shifter circuits 21 which receive the signals $V_{HP}$, $V_{HN}$. The outputs of level shifter circuits 21 are applied to inputs of gate driver circuits 22 and 24, and $V_{IN}$ –2.8 V. Gate driver circuitry 22 generates the signals $V_{S1, 2, \ldots 5}$, $V_P$, and $V_{DR}$ the output of gate driver circuit 24 generates the signal $V_N$.

The SIMO DC-DC converter 10 of Prior Art FIG. 2 is much smaller than earlier SIMO DC-DC converters, and includes two transistor switches, including input switch transistor MP coupled in series with any selected one of output switch transistors MS1, 2 . . . , 5 through a path from the converter input $V_{IN}$ to any of the its outputs $V_{OUT1, 2, \ldots 5}$. Both input switch MP and the selected output switch dissipate a significant amount of power. The output capacitors $C_{L1, 2, \ldots N}$ are relatively large, which is undesirable because they add substantially to the total system cost.

Prior Art FIG. 3A illustrates a basic "resonant" SISO DC-DC converter, similar to FIG. 1 of the article "Family of Soft-Switching Resonant DC-DC Converters" by M. Jabbari et al., pp. 113-124, IET Power Electronics, 2009, Vol. 2, Issue 2, incorporated herein by reference. The working modes of this resonant DC-DC converter include a full resonance mode, a partial resonance mode, a linear current mode, and a dead time mode, as fully described in the Jabbari et al. article. Phase 1 includes charging the inductor L and output capacitor $C_L$. The inductor current $I_L$ is positive and increasing. In FIG. 3A, with $V_{RES}$ precharged to $2 \times V_{IN}$ and switch SW3 OFF, switch SW1 is turned ON in a "ZCS" (zero current switching) mode, but not in a ZVS (zero voltage switching) mode. Current flows from the node $V_{RES}$ or ground to $V_{OUT1}$ via resonant capacitor $C_{RES}$, inductor L, and switch SW1 while $V_{RES}$ is greater than $V_{OUT1}$. Phase 2 includes discharging inductor L and charging output capacitor $C_L$. Inductor current $I_L$ is positive but decreasing. In FIG. 3A, while $0 < V_{RES} < V_{OUT1}$, current flows from the node $V_{RES}$ or ground through resonant capacitor $C_{RES}$, inductor L, and switch SW1. When $V_{RES}$ is less than or equal to 0, current flows from ground to $V_{OUT1}$ via switch SWR, inductor L, and switch SW1. Phase 3 is referred to as the "resonant mode" phase, during which the direction of inductor current $I_L$ is negative. In FIG. 3A, current flows from ground to $V_{IN}$ via switch SW3 when both switches SW1 and SWR are OFF, to allow the charge associated with $V_{RES}$ to return to a voltage level equal to $2 \times V_{IN}$.

Prior Art FIG. 3B illustrates a basic "resonant" two-output SIMO buck DC-DC converter similar to the one shown in FIG. 1 of the article "Simulation and Implementation of a New Topology in Multi-Output DC-DC Resonant Converters Based on SWRC Converters" by S. H. Shahalami et al., pp. 75-80, IEEE 2011 $2^{nd}$ Power Electronics, Drive Systems and Technologies Conference. The resonant 2-output SIMO buck converter of Prior Art FIG. 3B is quite similar to the resonant single output SISO buck converter of Prior Art FIG. 3A. The difference between the two is in using two (or more) output switch transistors, rather than one. Input switch transistor Q0 is used to connect the DC input source voltage $V_{IN}$ to the resonator tank circuit L,$C_{RES}$ and the 2 output switch transistors Q1 and Q2 are used to connect the resonator L,$C_{RES}$ to 2 output load capacitors $C_{L1}$ and $C_{L2}$, respectively. The working modes include a full resonance mode, a partial resonance mode, a linear current mode, and a dead time mode, as fully described in the above mentioned Shahalami et al. paper. State waveforms for the DC-DC converter of FIG. 3B are shown in FIG. 3C, and are the same as in FIG. 2 of the Shahalami et al. reference.

In a conventional non-resonant DC-DC converter, the inductor current $I_L$ flows unidirectionaly relative to the inductor. For example, there is only "positive inductor" current from $V_{IN}$ to Vout for a conventional buck converter. In contrast, in "resonant" DC-DC converters the current flow $I_L$ in inductor L and the capacitor $C_{RES}$ that form the resonator have both "positive" and "negative" values. The resonant architecture shown in FIG. 3A, with resonant capacitor $C_{RES}$ and also including a resonant diode $D_{RES}$, allows both positive and negative current flow through inductor, which also true for the resonant architecture of the SIMO DC-DC converter shown in FIG. 3B.

Resonant DC-DC converters have lower or zero dynamic losses and lower EMI than non-resonant converters, due to the "soft switching" techniques for turning switch transistors on and off such that there is zero voltage across or zero current through the switch transistors while they are being switched.

To summarize, current state-of-the-art resonant DC-DC converters can be used to provide "soft-switching" and higher efficiency SIMO DC-DC converters. (The term "soft switching" refers to switching using ZVS (zero voltage switching) and/or ZCS (zero current switching) techniques.) Most of current state of the art switch-based resonant converters have several drawbacks that make them less desirable than standard DC-DC converters. These drawbacks include higher RMS current in the inductor, higher voltage seen by power switches (sometimes more than double the input voltage seen by the power switches), and limited power density output. The SIMO (Single Inductor Multiple Output) DC-DC converter has recently been used frequently due to its ability to utilize the full energy storage capacity of a single inductor shared by multiple output loads to avoid the need to provide multiple LDO (low drop out) voltage regulators. The use of SIMO DC-DC converters therefore potentially allows higher system power efficiency and reduced system cost, but unfortunately, the cost of present state-of-the-art SIMO DC-DC converters is high. They also generate high EMI (electromagnetic interference) have cross-regulation problems.

Thus, there is an unmet need for a resonant DC-DC converter having lower RMS current and reduced voltages across the power switches than is the case in prior DC-DC converters having somewhat comparable performance.

There also is an unmet need for a resonant DC-DC converter which allows higher system power efficiency and lower system cost than is the case in prior DC-DC converters having somewhat comparable performance.

There also is an unmet need for a resonant SIMO DC-DC converter which allows higher system power efficiency and lower system cost than is the case in prior SIMO DC-DC converters having somewhat comparable performance.

There also is an unmet need for a resonant SIMO DC-DC converter which has lower cross-regulation, higher power efficiency for a given integrated circuit package volume, and lower cost than prior SIMO DC-DC converters having somewhat comparable performance and than prior SISO DC-DC converters having somewhat comparable performance.

There also is an unmet need for a resonant SIMO DC-DC converter which has a less limited range of input and output voltages than prior SIMO DC-DC converters having somewhat comparable performance.

There also is an unmet need for a resonant SIMO DC-DC converter which generates less electromagnetic interference than prior SIMO DC-DC converters having somewhat comparable performance.

There also is an unmet need for a resonant SIMO DC-DC converter which makes it possible to use a relatively large number of low-voltage transistors in a high voltage DC-DC converter.

SUMMARY OF THE INVENTION

It is an object of the invention to provide a resonant DC-DC converter having lower RMS current and reduced voltages across the power switches than is the case in prior DC-DC converters having somewhat comparable performance.

It is another object of the invention to provide a resonant DC-DC converter which allows higher system power efficiency and lower system cost than is the case in prior DC-DC converters having somewhat comparable performance.

It is another object of the invention to provide a resonant SIMO DC-DC converter which allows higher system power efficiency and lower system cost than is the case in prior SIMO DC-DC converters having somewhat comparable performance.

It is another object of the invention to provide a resonant SIMO DC-DC converter which has lower cross-regulation, higher power efficiency for a given SIMO DC-DC converter package volume, and lower cost than prior SIMO DC-DC converters having somewhat comparable performance and than prior SISO DC-DC converters having somewhat comparable performance.

It is another object of the invention to provide a resonant SIMO DC-DC converter which has a less limited range of input and output voltages than prior SIMO DC-DC converters having somewhat comparable performance.

It is another object of the invention to provide a resonant SIMO DC-DC converter which generates less electromagnetic interference than prior SIMO DC-DC converters having somewhat comparable performance.

It is another object of the invention to provide a resonant SIMO DC-DC converter which makes it possible to use a relatively large number of low-voltage transistors in a high voltage DC-DC converter.

It is another object of the invention to provide a resonant SIMO DC-DC converter in which the voltage ratings of switch transistors can be scaled as a function of the converter output voltages and are independent of the converter input voltage.

Briefly described, and in accordance with one embodiment, the present invention provides a resonance-based DC-DC converter for converting a DC input voltage to a first DC output voltage ($V_{OUT1}$) on a output conductor (9) includes an inductor (L) having a first terminal connected to a source (2) of a DC input voltage ($V_{IN}$) and a second terminal coupled to a first conductor (4) and a capacitor ($C_{RES}$) having a first terminal coupled to the first conductor. A first switch (SW1) is coupled between the resonance conductor and the output conductor to conduct inductor current ($I_L$) into the output conductor during a first phase (Phase1). A second switch (SW2) is coupled between a second terminal of the capacitor and the output conductor to conduct inductor current through the capacitor into the output conductor (9) during a second phase (Phase2). A third switch (SW3) is coupled between the second terminal (31) of the capacitor and a first reference voltage (GND) to conduct inductor current from a source of the first reference voltage through the capacitor to the input voltage ($V_{IN}$) during a third phase (Phase3).

In one embodiment, the invention provides a resonance-based DC-DC converter for converting a DC input voltage ($V_{IN}$) to a first DC output voltage ($V_{OUT1}$) on a first output conductor (9), including an inductor (L) having a first terminal directly coupled to a source (2) of a DC input voltage ($V_{IN}$) and a second terminal coupled to a resonance conductor (4,$V_{RES}$); a resonance capacitor ($C_{RES}$) having a first terminal coupled to the resonance conductor (4,$V_{RES}$); a first switch (SW1) coupled between the resonance conductor (4,$V_{RES}$) and the first output conductor (9), for conducting inductor current ($I_L$) into the first output conductor (9) during a first phase (Phase1); a second switch (SW2) coupled between a second terminal (31) of the resonance capacitor ($C_{RES}$) and the first output conductor (9), for conducting inductor current ($I_L$) through the resonance capacitor ($C_{RES}$) into the first output conductor (9) during a second phase (Phase2); and a third switch (SW3) coupled between the second terminal (31) of the resonance capacitor ($C_{RES}$) and a first reference voltage (GND) for conducting inductor current ($I_L$) from a source of the first reference voltage (GND) through the resonance capacitor ($C_{RES}$) into the source (2) of the input voltage ($V_{IN}$) during a third phase (Phase3).

In a described embodiment the first (SW1), second (SW2), and third (SW3) switches are unidirectional switches, and none of the first (SW1), second (SW2), and third (SW3) switches operates as an input switch of the resonance-based DC-DC converter.

In one embodiment the inductor (L) is external to an integrated circuit chip in which the resonance capacitor ($C_{RES}$) and the first (SW1), second (SW2), and third (SW3) switches are located.

In one embodiment, control circuitry (32,32A) controls the first (SW1), second (SW2), and third (SW3) switches in accordance with the first (Phase1), second (Phase2), and third (Phase3) phases, wherein the first (Phase1), second (Phase2), and third (Phase3) phases are non-overlapping. The control circuitry (32,32A) closes the first (SW1) and third (SW3) switches and opens the second switch (SW2) during the first phase (Phase1), closes the second switch (SW2) and opens the first (SW1) and third (SW3) switches during the second phase (Phase2), and causes the first switch (SW1) to remain open (OFF), opens the second switch (SW2), and closes the third switch (SW3) during the third phase (Phase3).

In one embodiment, the control circuitry (32,32A) includes a first comparator (33) for detecting when the first output voltage ($V_{OUT1}$) is less than a minimum level ($V_{REF\_LO}$) representative of a second reference voltage ($V_{REF}$) to generate a first level of a first signal (KICK) which causes the control circuitry (32,32A) to control the first (SW1), second (SW2), and third (SW3) switches so as to cause the inductor current ($I_L$) to charge a first load ($C_{L1}$) connected to the first output conductor (9), the first comparator (33) also detecting when the first output voltage ($V_{OUT1}$) is greater than a maximum level ($V_{REF\_HI}$) representative of the second reference voltage ($V_{REF}$) to generate a second level of the first signal (KICK) which causes the control circuitry (32,32A) to control the first (SW1), second (SW2), and third (SW3) switches so as to prevent the inductor current ($I_L$) from further charging the first load ($C_{L1}$).

In one embodiment, the control circuitry (32,32A) includes comparing circuitry (35,37) for detecting zero-crossing occurrences of the inductor current ($I_L$) for to determine times at which the first (SW1) and third (SW3) switches need to be closed (ON) and times at which the second switch (SW2) needs to be open (OFF). The control circuitry (32,32A) includes an error amplifier (34) for comparing the first output voltage ($V_{OUT1}$) with a minimum level ($V_{RES\_MIN}$) of a resonance voltage ($V_{RES}$) of the resonance conductor (4) to generate a difference signal representative of a difference between the first output voltage ($V_{OUT1}$) and the minimum level ($V_{RES\_MIN}$) of the resonance voltage ($V_{RES}$), and wherein the control circuitry (32,32A) also includes voltage-to-delay conversion circuitry (40) for converting the difference signal ($V_{OUT1}-V_{RES\_MIN}$) to a time duration ($T_{ON}$) during which the first switch (SW1) is closed (ON) during the first phase (Phase1).

In one embodiment the control circuitry (32,32A) operates to perform zero voltage switching (ZVS) and zero current switching (ZCS) of the first (SW1) and second (SW2) switches.

In one embodiment, a fourth switch (SW1_BUCK2) coupled between the resonance conductor (4,$V_{RES}$) and a second output conductor (9-2), for conducting inductor current ($I_L$) into the second output conductor (9-2) during the first phase (Phase1); and a fifth switch (SW2_BUCK2) coupled between the second terminal (31) of the resonance capacitor ($C_{RES}$) and the second output conductor (9-2), for conducting inductor current ($I_L$) through the resonance capacitor ($C_{RES}$) into the second output conductor (9-2) during the second phase (Phase2), whereby the resonance-based DC-DC converter converts the DC input voltage ($V_{IN}$) to a second DC output voltage ($V_{OUT\_BUCK2}$) on the second output conductor (9-2). The control circuitry (32A) controls the fourth (SW1_BUCK2), fifth (SW2_BUCK2), and third (SW3) switches in accordance with the first (Phase1), second (Phase2), and third (Phase3) phases, wherein the first (Phase1), second (Phase2), and third (Phase3) phases are non-overlapping. The control circuitry (32A) closes the fourth (SW1_BUCK2) and third (SW3) switches and opens the fifth switch (SW2_BUCK2) during the first phase (Phase1), closes the fifth switch (SW2_BUCK2) and opens the fourth (SW1_BUCK2) and third (SW3) switches during the second phase (Phase2), and causes the fourth switch (SW1_BUCK2) to remain open, opens the fifth switch (SW2_BUCK2), and closes the third switch (SW3) during the third phase (Phase3). The control circuitry (32A) includes a second comparator (33A) for detecting when the second output voltage ($V_{OUT\_BUCK2}$) is less than a minimum level ($V_{REF\_LO}$) representative of a second reference voltage ($V_{REF}$) to generate a first level of a second signal (KICK2) which causes the control circuitry (32A) to control the fourth (SW1_BUCK2), fifth (SW2_BUCK2), and third (SW3) switches so as to cause the inductor current ($I_L$) to charge a second load ($C_{L2}$) connected to the second output conductor (9-2), the second comparator (33B) also detecting when the second output voltage ($V_{OUT\_BUCK2}$) is greater than a maximum level ($V_{REF\_HI}$) representative of the second reference voltage ($V_{REF}$) to generate a second level of the second signal (KICK2) which causes the control circuitry (32A) to control the fourth (SW1_BUCK2), fifth (SW2_BUCK2), and third (SW3) switches so as to prevent the inductor current ($I_L$) from further charging the second load ($C_{L2}$).

In one embodiment, a boosting transistor (SW1_BOOST1) is coupled between the resonance conductor (4,$V_{RES}$) and the first reference voltage (GND) and a second boosting transistor (SW2_BOOST1) is coupled between the resonance conductor (4,$V_{RES}$) and a second output conductor (9-3) to produce a boosted output voltage ($V_{OUT\_BOOST1}$) on the second output conductor (9-3).

In one embodiment, the invention provides a method for converting a DC input voltage ($V_{IN}$) to a DC output voltage ($V_{OUT1}$) on an output conductor (9) by means of a resonance-based DC-DC converter, the method including coupling a first terminal of an inductor (L) directly to a source (2) of the DC input voltage ($V_{IN}$), coupling a second terminal of the inductor (L) to a resonance conductor (4,$V_{RES}$), and coupling a first terminal of a resonance capacitor ($C_{RES}$) to the resonance conductor (4,$V_{RES}$); conducting inductor current ($I_L$) from the resonance conductor (4,$V_{RES}$) through a first switch (SW1) into the output conductor (9) during a first phase (Phase1); conducting inductor current ($I_L$) through the resonance capacitor ($C_{RES}$) and a second switch (SW2) and into the output conductor (9) during a second phase (Phase2); and conducting inductor current ($I_L$) from a source of a first reference voltage (GND) through a third switch (SW3), through the resonance capacitor ($C_{RES}$), and through the inductor (L) into the source (2) of the input voltage ($V_{IN}$) during a third phase (Phase3).

In one embodiment the method includes closing the first (SW1) and third (SW3) switches and opening the second switch (SW2) during the first phase (Phase1), closing the second switch (SW2) and opening the first (SW1) and third (SW3) switches during the second phase (Phase2), and causing the first switch (SW1) to remain open, opening the second switch (SW2), and closing the third switch (SW3) during the third phase (Phase3).

In one embodiment the method includes detecting when the output voltage ($V_{OUT1}$) on the output conductor (9) is less than a minimum level ($V_{REF\_LO}$) representative of a second reference voltage ($V_{REF}$) and, in response to the detecting, generating a first level of a signal (KICK) and controlling the first (SW1), second (SW2), and third (SW3) switches in response to the signal (KICK) so as to cause the inductor current ($I_L$) to charge a load ($C_{L1}$) connected to the output conductor (9), and also detecting when the output voltage ($V_{OUT1}$) is greater than a maximum level ($V_{REF\_HI}$) representative of the second reference voltage ($V_{REF}$), and, in response to that detecting, generating a second level of the signal (KICK) and controlling the first (SW1), second (SW2), and third (SW3) switches in response to that detecting so as to prevent the inductor current ($I_L$) from further charging the load ($C_{L1}$).

In one embodiment the method includes detecting zero-crossing occurrences of the inductor current ($I_L$) and, in response to that detecting, determining times at which the first (SW1) and third (SW3) switches need to be closed and times at which the second switch (SW2) needs to be open (OFF).

In one embodiment the method includes comparing the output voltage ($V_{OUT1}$) with a minimum level ($V_{RES\_MIN}$) of a resonance voltage ($V_{RES}$) of the resonance conductor (4) to generate a difference signal representative of a difference between the output voltage ($V_{OUT1}$) and the minimum level ($V_{RES\_MIN}$) of the resonance voltage ($V_{RES}$), and converting the difference signal ($V_{OUT1}-V_{RES\_MIN}$) to a time duration during which the first switch (SW1) is closed (ON) during the first phase (Phase1).

In one embodiment, the invention provides a circuit for converting a DC input voltage ($V_{IN}$) to a first DC output voltage ($V_{OUT1}$) on a first output conductor (9) by means of a resonance-based DC-DC converter, including means (2A) for coupling a first terminal of an inductor (L) directly to a source (2) of the DC input voltage ($V_{IN}$), means (4) for coupling a second terminal of the inductor (L) to a resonance conductor (4,$V_{RES}$), and means (4,$V_{RES}$) for coupling a first terminal of a resonance capacitor ($C_{RES}$) to the resonance conductor (4,$V_{RES}$); means (4-9) for conducting inductor current ($I_L$) from the resonance conductor (4,$V_{RES}$) through a first switch (SW1) into the first output conductor (9) during a first phase (Phase1); means (4-31) for conducting inductor current ($I_L$) through the resonance capacitor ($C_{RES}$) and a second switch (SW2) and into the first output conductor (9) during a second phase (Phase2); and means (31,4,2A) for conducting inductor current ($I_L$) from a source of the first reference voltage (GND) through a third switch (SW3), through the resonance capacitor ($C_{RES}$), and through the inductor (L) into the source (2) of the input voltage ($V_{IN}$) during the third phase (Phase3).

BRIEF DESCRIPTION OF THE DRAWINGS

FIG. 4A shows a simplified diagram of a DC-DC buck converter in accordance with the present invention.

FIG. 4C is a timing diagram useful in understanding the operation of the DC-DC buck converter of FIGS. 4A and 4B.

FIG. 5B shows details of circuitry in block 36 of FIG. 5A.

FIG. 5C is a block diagram of additional circuitry included in block 32A in FIG. 5A.

DETAILED DESCRIPTION OF THE PREFERRED EMBODIMENTS

Figure 1A:
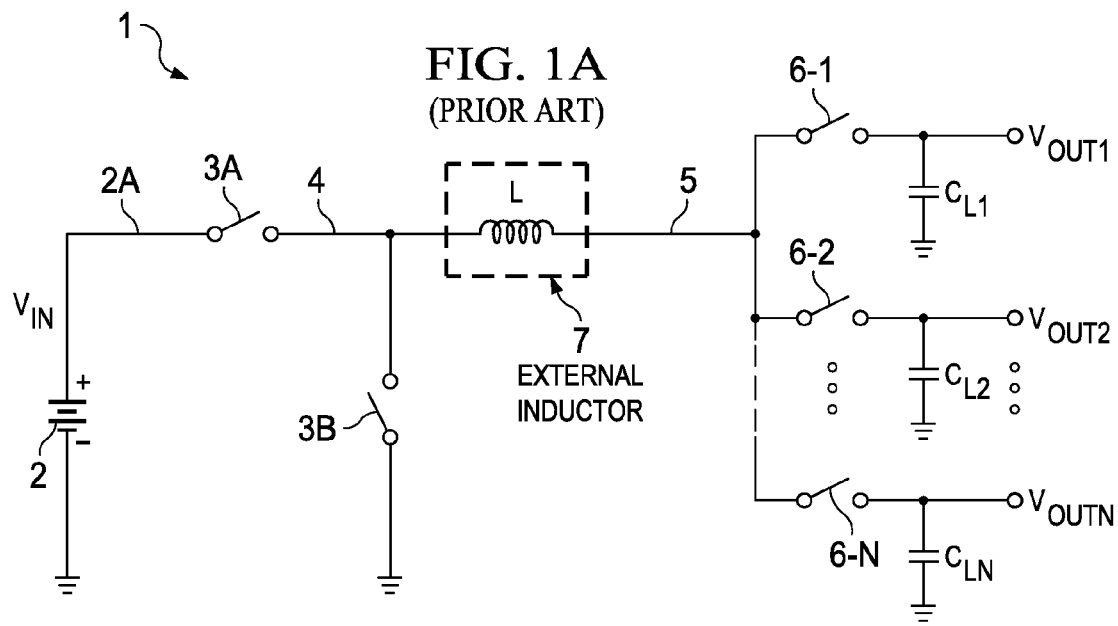
FIG. 1A is a simplified schematic diagram of a known SIMO DC-DC converter.
Figure 1B:
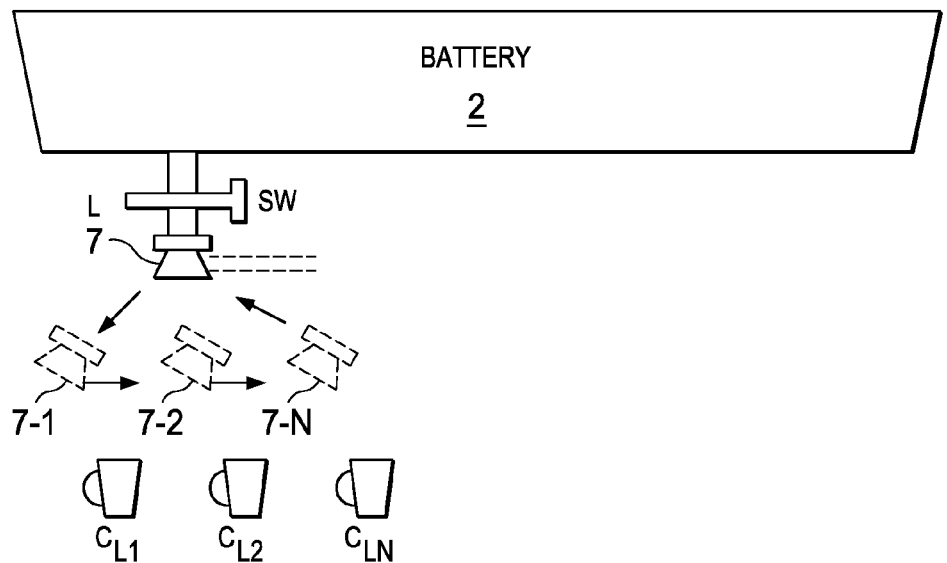
FIG. 1B is a pictorial diagram useful in explaining the operation of the circuit in FIG. 1A.
Figure 2:
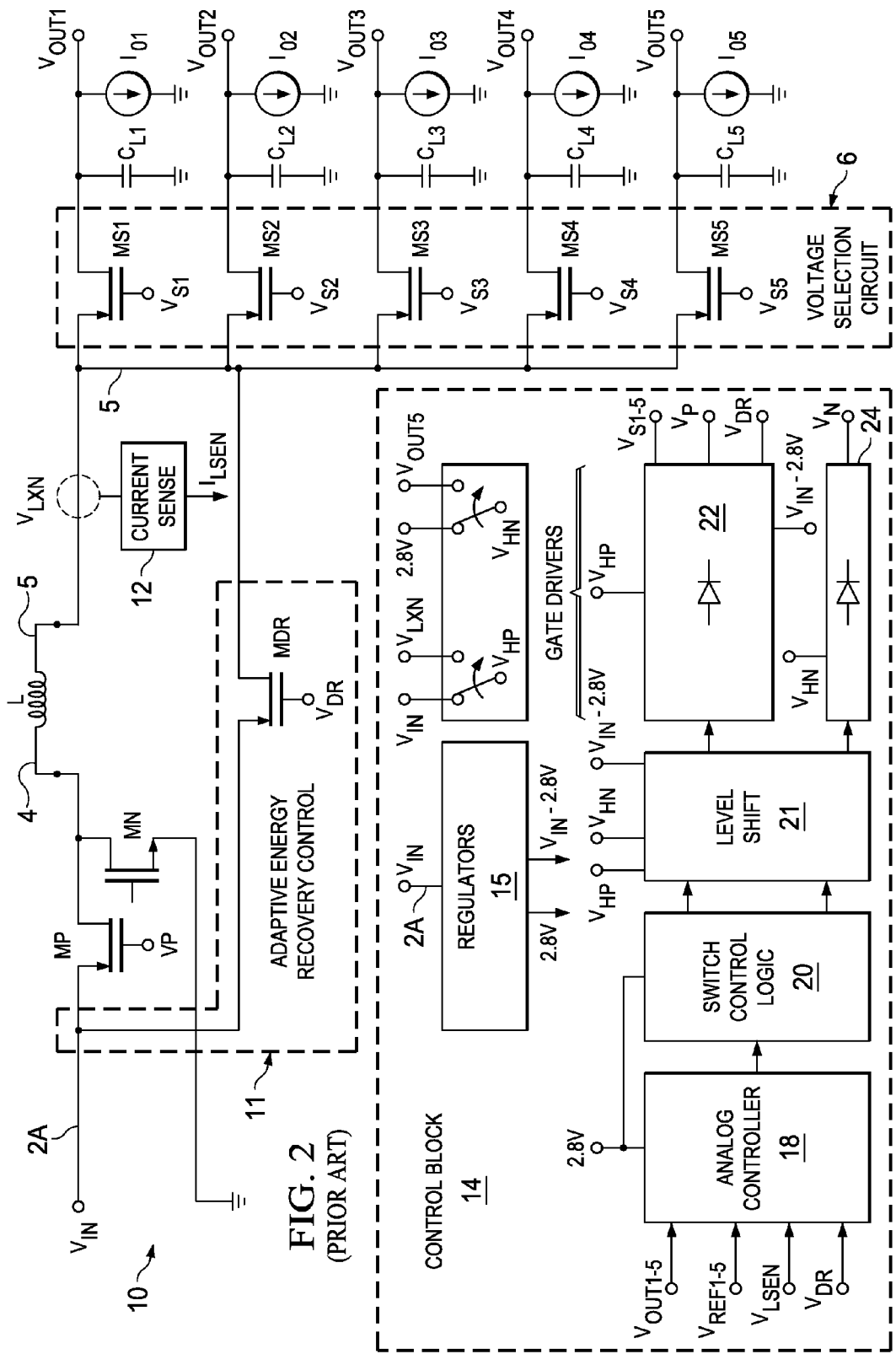
FIG. 2 is a schematic diagram of a known single-inductor 5-output buck converter.

An optimum DC-DC converter topology preferably has "soft switching", i.e., ZVS (zero voltage switching) and ZCS (zero current switching) wherein switching of a typical MOS switch transistor therein is performed only when both the source and drain terminals are at essentially the same voltage. However, most DC-DC converters include at least one "non-ZVS" switching transistor, which typically is the "high side" input switch transistor. (A "high side" input switch is connected to the positive supply voltage and a "low side" input switch is connected to ground.) An input switch transistor supplies current to the external inductor of a typical DC-DC converter. One reason that ZVS switching is not commonly used in DC-DC converters is that most of them do not use "resonant techniques" such as those mentioned previously. (In a resonant DC-DC converter, the current flow through inductor L is bidirectional, rather than unidirectional as in non-resonant DC-DC converters. The operating modes of a resonant DC-DC converter include a full resonance mode, a partial resonance mode, a linear current mode, and a dead time mode, somewhat similarly to the modes described in the above mentioned Jabbari et al. reference.)

Although conventional buck converters are "input-switch-driven" in order to control the inductor current, the described DC-DC converters according to the present invention eliminate the input switches, and instead are completely "output-switch-driven". This means the output switches and the amount of loading thereon determine the amount of current through the inductor. The described embodiments of the invention make it possible to use more relatively small, low-voltage transistors and fewer larger, more costly high-voltage transistors in a high-voltage DC-DC converter. (It should be appreciated that making transistors smaller ordinarily reduces parasitic capacitances, which results in improved high frequency operation and greatly reduces power losses.)

FIG. 4A is a simplified diagram of a basic resonant SISO (single input, single output) DC-DC buck converter 30. SISO converter 30 includes an input 2A which conducts an input voltage $V_{IN}$ that typically is produced by a battery 2. One terminal of an inductor L is connected to $V_{IN}$, and the other terminal of inductor L is connected by conductor 4 to one terminal of resonator capacitor $C_{RES}$ and one terminal of a high-voltage (HV) switch SW1. The other terminal of high voltage switch SW1 is connected by conductor 9 to one terminal of load capacitor $C_{L1}$, the other terminal of which is connected to a reference voltage such as ground. The other terminal of resonator capacitor $C_{RES}$ is connected by conductor 31 to one terminal of a low-voltage (LV) switch SW2 and one terminal of a LV switch SW3. The other terminal of switch SW2 is connected to output conductor 9, and the other terminal of LV switch SW3 is connected to a reference voltage such as ground. Current flowing through inductor L is designated by $I_L$. An output voltage $V_{OUT1}$ is produced on output conductor 9.

Figure 4B:
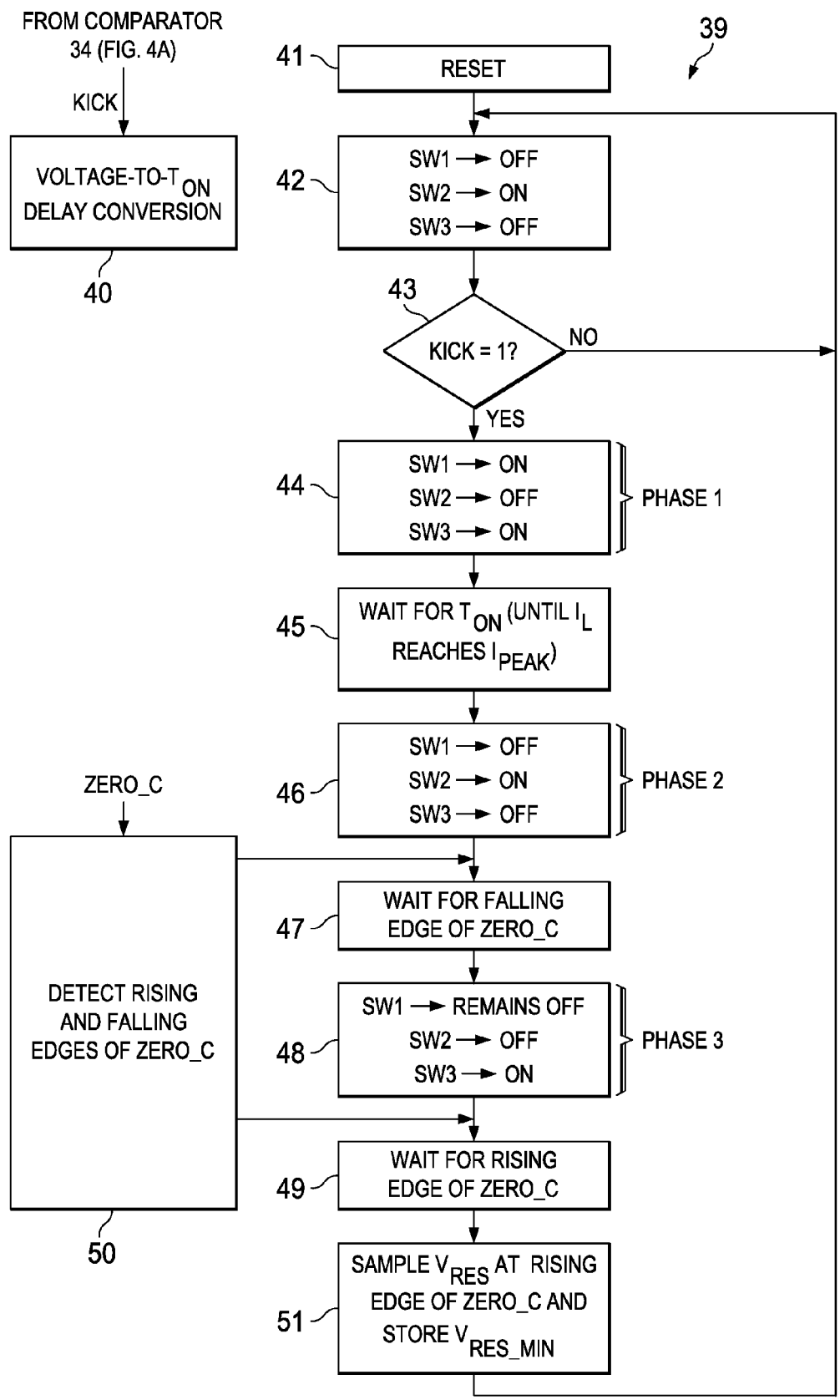
FIG. 4B shows a control algorithm implemented in block 32 of FIG. 4A.

Switches SW1, SW2, and SW3 in FIG. 4A are controlled by control circuitry 32, which generates control signals 38 that are coupled to the control terminals (not shown) of each of switches SW1, SW2, and SW3, respectively. (SW1, SW2, and SW3 ordinarily are MOS transistors or CMOS transmission gates, and their gate electrodes are the control terminals of switches SW1, SW2, and SW3.) Control circuitry 32 includes a control algorithm circuit 39. (Details of the algorithm are shown in subsequently described FIG. 4B.) Control circuit 32 also includes an error amplifier or comparator 33, hereinafter referred to as comparator 33, having its (+) input connected to a reference voltage $V_{REF}$ and its (−) input connected to $V_{OUT1}$. The output of comparator 33 provides a signal KICK to an input of control algorithm circuit 39. To achieve regulation of the voltage $V_{OUT1}$ at the DC-DC converter output 9, comparator 33 compares $V_{OUT1}$ with reference voltage $V_{REF}$ to generate the signal KICK. The reference voltage $V_{REF}$ can be thought of as having, in effect, upper and lower hysteresis-determined values $V_{REF\_HI}$ and $V_{REF\_LO}$, respectively. The output voltage $V_{OUT1}$ is considered to be a DC voltage while it is regulated between $V_{REF\_HI}$ and $V_{REF\_LO}$.

The (+) input of an amplifier 34 is connected to a minimum value $V_{RES\_MIN}$, which is illustrated in the $V_{RES}$ waveform that is included in FIG. 4A. The (−) input error amplifier 34 is also connected to $V_{OUT1}$. The output of amplifier 34 supplies a signal representative of the difference between $V_{OUT1}$ and a minimum value $V_{RES\_MIN}$ of the voltage $V_{RES}$ on output conductor 9 to an input of a voltage-to-$T_{ON}$ conversion circuit 40 that can be thought of as being included in control algorithm circuit 39. Voltage-to-$T_{ON}$ conversion circuit 40 converts that difference voltage to provide a time duration value $T_{ON}$ which is utilized to determine the time or duration during which switch SW1 is turned ON to increase or "charge" the inductor current $I_L$ and deliver it into $V_{OUT1}$ conductor 9.

A "current comparator" is represented by the combination of comparator 35 and resistor 37. Comparator 35 has its (+) input connected to one terminal of resistor 37 through which the inductor current $I_L$ flows to ground. Current comparator 35 generates a transition of an output signal ZERO_C whenever the increasing or decreasing inductor current $I_L$ crosses through zero. The waveform of the inductor current $I_L$ is also shown in the above mentioned graph included in FIG. 4A.

Referring to FIG. 4B, the controlling algorithm 39 is reset at the beginning of each cycle, as indicated in block 41. Control algorithm circuitry 39 generates control signals 38 in FIG. 4A so as to turn switch SW2 on and turn switches SW1 and SW3 off, as indicated in block 42. Control algorithm 39 then goes to decision block 43 to determine whether $V_{OUT1}$ is lower than previously mentioned low hysteresis value $V_{REF\_LO}$, in which case the signal KICK goes to its "HI" or "1" level. If the determination of decision block 43 is negative, the algorithm returns to block 42. If the determination of decision block 43 is affirmative, the control algorithm goes to block 44 to initiate Phase1 of a repetitive cycle including Phase1, Phase2, and Phase 3. During Phase1, control circuit 39 turns switches SW1 and SW3 ON and turns switch SW2 OFF, as indicated in block 44. Thus, Phase1 is the linear phase or charge time for the build-up of current $I_L$ in inductor L, and this continues until comparator 33 determines that $V_{OUT1}$ has reached the previously mentioned high hysteresis value $V_{REF\_HI}$. Then algorithm 39 waits for an amount of time equal to $T_{ON}$, i.e., until the inductor current $I_L$ reaches a peak value $I_{PEAK}$, as indicated in block 45.

Next, algorithm 39 turns switches SW1 and SW3 off and turns switch SW2 on, as indicated in block 46, thereby entering Phase 2. (Note that a "guard time" is required between the turn-off of switches SW1 and SW3 and the turn-on of switch SW2, and suitable guard time is required between the turn-off of switch SW3 and the turn-on of switch SW2.) Next, algorithm 39 waits until the falling edge of inductor current $I_L$ undergoes a zero crossing as indicated in block 47, and then SW1 remains OFF and SW3 turns ON and switch SW2 turns off, as indicated in block 48. This is the beginning of Phase 3. Then control algorithm 39 waits until the rising edge of inductor current $I_L$ undergoes a zero crossing as indicated in block 49, and then goes to block 51.

In block 51, control algorithm 39 samples the value of $V_{RES}$ at the zero crossing point of the rising edge of inductor current $I_L$ and stores that minimum value $V_{RES\_MIN}$. ZERO_C is either a HI "1" level or a LO "0" zero level which is detected in accordance with block 50 of algorithm 39 to indicate the times at which positive-going and negative-going transitions of ZERO_C occur. A rising edge of ZERO_C indicates when the inductor current $I_L$ switches direction from negative to positive and the falling edge of ZERO_C indicates when inductor current $I_L$ switches direction from negative back to positive. This ZERO_C transition information produced by current comparator 35,37 is utilized in accordance with blocks 47 and 49 to determine when to begin and end Phase3. The output of block 51 then reenters decision block 43.

When the signal KICK goes to its "LO" or "0" level to cause the control loop to stop charging output conductor 9, $V_{OUT1}$ then starts being discharged by the load current drawn from output conductor 9. Whenever $V_{OUT1}$ falls below low hysteresis value $V_{REF\_LO}$, KICK switches back to its HI or "1" level and the foregoing charging process is repeated, to thereby continue the regulation of $V_{OUT1}$.

FIG. 4C shows waveforms of inductor current $I_L$ and the voltage signal $V_{RES}$ in FIG. 4A during Phase 1, Phase 2, and Phase 3 and also shows diagrams indicating the timing of Phase 1, Phase 2, and Phase 3 relative to the $I_L$ and $V_{RES}$ waveforms. Note that the $I_L$ and $V_{RES}$ waveforms shown in previously described FIG. 4A are for "pure resonant" operation of a basic resonant LC circuit not having any switches such as SW1, SW2, and SW3, whereas the operation of switches SW1, SW2, SW3 substantially modifies the appearance of the resulting $I_L$ and $V_{RES}$ waveforms shown in FIG. 4C for the circuit shown in FIG. 4A. In FIG. 4C, the locations of the positive peak value $I_{PEAK(+)}$ and the negative peak value $I_{PEAK(-)}$ are shown on the $I_L$ waveform, where $$I_{PEAK(+)} = \frac{V_{IN}}{\sqrt{\frac{L}{C_{RES}}}}$$

and $$I_{PEAK(-)} = \frac{-(V_{IN} - V_{OUT})}{\sqrt{\frac{L}{C_{RES}}}}.$$

Due to the resonant nature of DC-DC converter 30 of FIG. 4A, the voltage $V_{RES}$ on conductor 4 swings between a peak voltage $V_{PEAK}=2\times V_{IN}$ and a minimum voltage $V_{MIN}=V_{OUT1}$. The frequency of oscillation is determined by the values of inductor L and resonant capacitor $C_{RES}$. Phase 1 of the circuit operation begins when the voltage swing of $V_{RES}$ becomes equal to $V_{OUT1}$. During Phase 1, switch transistors SW1 and SW3 are closed or ON and switch transistor SW2 is open or OFF so that a positive voltage is produced across inductor L and the voltage across capacitor $C_{RES}$ becomes equal to output voltage $V_{OUT1}$. Inductor current $I_L$ is positive and increasing, and flows from battery 2 through inductor L into $C_{RES}$ and through switch SW1 into output capacitor $C_{L1}$, so inductor L is being charged and output capacitor $C_{L1}$ and resonant capacitor $C_{RES}$ also are being charged.

Since switch SW1 is being turned ON at the time when the voltage across capacitor $C_{RES}$ is equal to output voltage $V_{OUT1}$, all of the advantages of ZVS (zero voltage switching) are achieved. The main advantage of ZVS switching is that since the voltage across switch SW1 is zero, there is no dissipative energy loss in capacitor $C_{RES}$ at the time switch SW1 is turned ON or closed. As also shown by the waveforms in FIG. 4C, the value of inductor current $I_L$ is exactly zero when $V_{RES}$ is at its voltage $V_{MIN}$, due to the resonant nature of the circuitry formed by inductor L and resonant capacitor $C_{RES}$. This ensures that switch SW1 is turned ON at the point in time at which the voltage across switch SW1 is zero (i.e., ZVS switching) and current through it is also zero (i.e., ZCS switching), thereby ensuring the combined advantages of ZVS and ZCS switching. Phase 1 continues until current in inductor L reaches a value which is determined by a variable, a limit circuit, or a variable timer circuit (not shown) which just ensures that the voltage $V_{MIN}$ of the voltage swing of $V_{RES}$ on conductor 4 is equal to $V_{OUT1}$ in the next cycle. The control circuit 32 (FIG. 4A) modifies the ON time interval $T_{ON}$ of switch SW1 or the limit of $I_L$.

Referring to Phase 2 indicated in FIG. 4C, switches SW1 and SW3 are open or OFF and switch SW2 is closed or ON. Therefore, the charging of load capacitor $C_{L1}$ continues as the decreasing inductor current $I_L$ flows from battery 2 through inductor L, resonator capacitor $C_{RES}$, and switch SW2 to output capacitor $C_{L1}$. During Phase 2 the voltage on node 31 is equal to $V_{OUT1}$.

It should be understood that the drain-source voltage (VDS) ratings of the MOS transistors typically utilized as switches SW2 and SW3 are dependent on the maximum magnitude of $V_{OUT1}$. That is, if the maximum magnitude of $V_{OUT1}$ is sufficiently low, then low voltage (LV) transistors can be used as switches SW2 and SW3. Note that only one series low-voltage switch transistor is turned ON during Phase 2. Phase 2 ends with the opening of switch SW2 when the inductor current $I_L$ reaches zero and reverses direction. At this instant, the voltage $V_{RES}$ has reached a maximum voltage peak $V_{PEAK}$ which is higher than the input voltage $V_{IN}$, and the decreasing inductor current $I_L$ has become equal to zero.

Phase 3 as indicated in FIG. 4C starts with switch SW3 turning ON with switches SW1 and SW2 both OFF. With switch SW3 turned ON and $V_{RES}$ being higher than input voltage $V_{IN}$, inductor current $I_L$ reverses direction in the resonant circuit, with inductor L and resonant capacitor $C_{RES}$ being connected in series between $V_{IN}$ and ground. $V_{RES}$ starts decreasing as the current $I_L$ (Phase 3) flows from the ground, through switch SW3, resonant capacitor $C_{RES}$, and inductor L into battery 2. As the direction of inductor current $I_L$ reverses, the voltage $V_{RES}$ comes to its voltage $V_{MIN}$. It can be noted that the magnitude of voltage $V_{MIN}$ is a direct function of the peak value $I_{PEAK(-)}$ of inductor current $I_L$. Therefore, either the limit current or the time at which switch SW1 is turned OFF is controlled in such a way that the voltage of $V_{RES}$ falls to a minimum value which is precisely equal to $V_{OUT1}$.

This completes the operation of the entire cycle including Phase1, Phase2, and Phase3. This cycle is repeated as long as the output feedback control by means of comparators 33 and 35 and error amplifier 34 requires transfer of charge to the output $V_{OUT1}$. It also should be understood that the drain-source voltage (VDS) ratings of the transistors utilized as switches SW2 and SW3 must be dependent on the maximum magnitude of output voltage $V_{OUT1}$. That is, if the maximum magnitude of $V_{OUT1}$ is sufficiently low, then lower voltage (LV) transistors can be used as switches SW2 and SW3. As discussed subsequently, there are certain advantages in speed and energy loss/switching operation in using low voltage transistors compared to using high voltage transistors.

It is emphasized that the foregoing operation is accomplished without use of any input transistor switch in resonant DC-DC converter 30. Since switch SW1 is a high-voltage transistor, it is the largest transistor in resonant DC-DC converter 30 and needs to have ZVS (zero-voltage switching) because it undergoes a large amount of drain-to-source voltage swing.

Figure 4D:
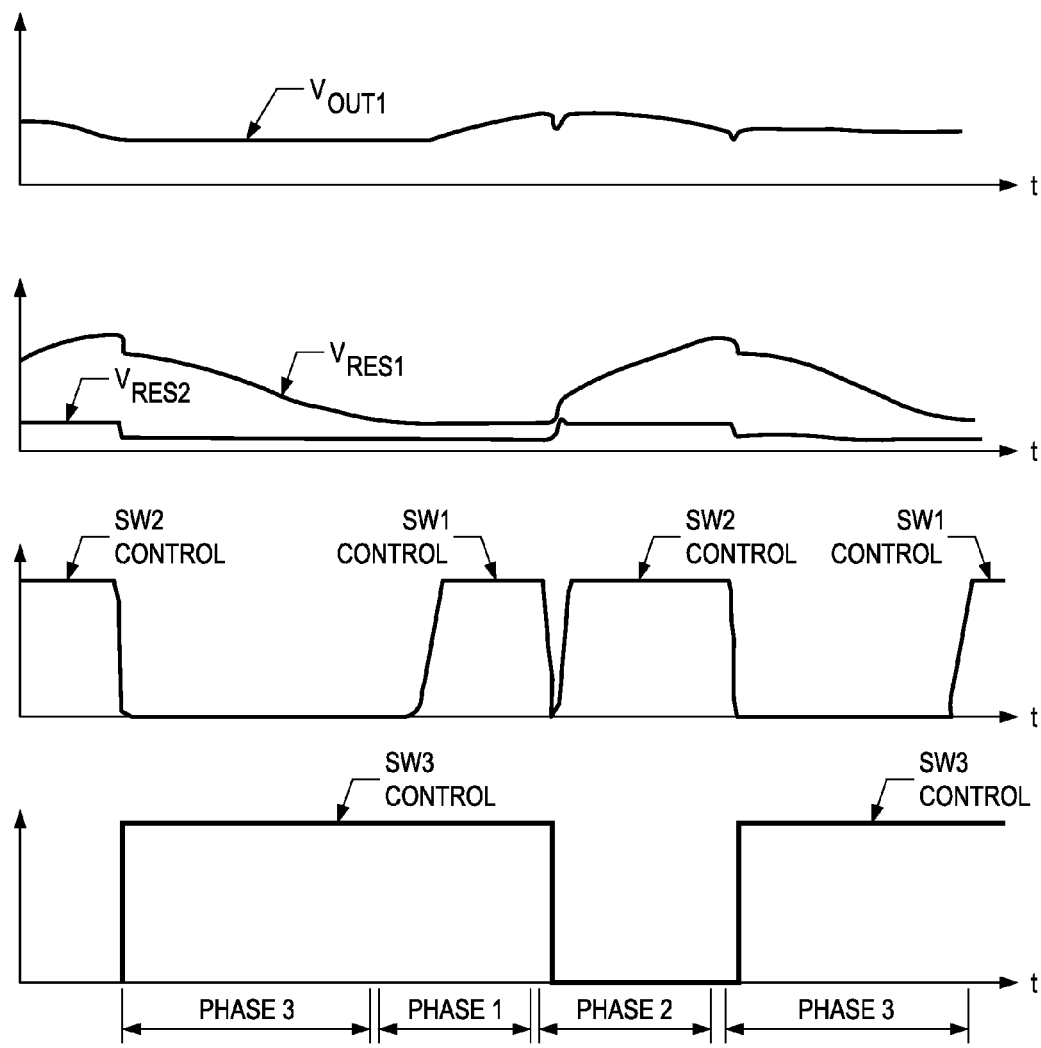
FIG. 4D is a timing diagram illustrating simulated voltage waveforms for the circuit shown in FIG. 4A.
Figure 4E:
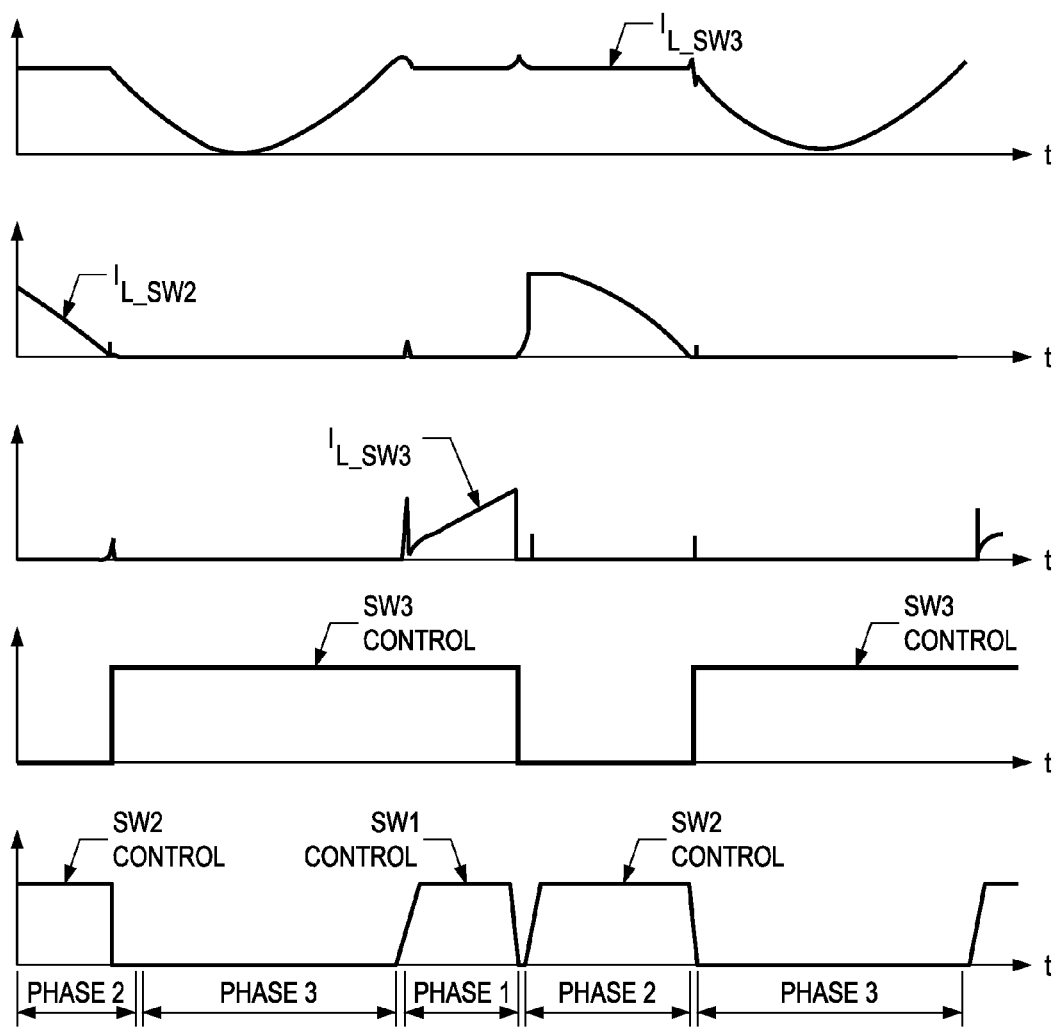
FIG. 4E is a timing diagram illustrating simulated current waveforms for the circuit shown in FIG. 4A.
Figure 4F:
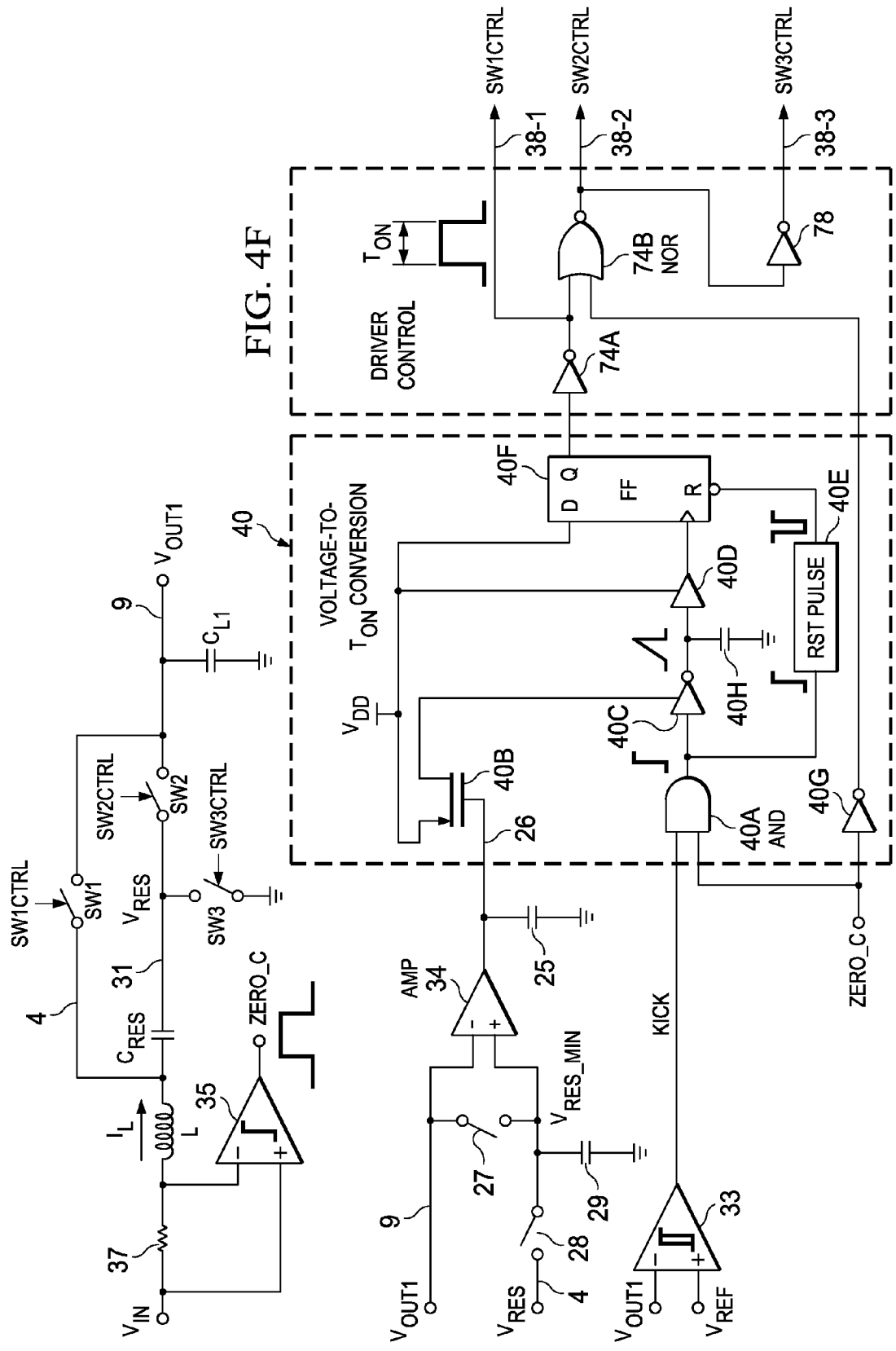
FIG. 4F shows more detail of some of the circuitry shown in FIG. 4A.

FIG. 4D is a timing diagram illustrating simulated voltage waveforms for the circuit shown in FIG. 4A. Note that FIG. 4D only shows voltage waveforms, whereas FIG. 4C shows the $I_L$ current waveform and the $V_{RES}$ voltage waveform together to illustrate the relationship between the peak inductor current and the peak the output. FIG. 4E is a timing diagram illustrating simulated current waveforms for the circuit shown in FIG. 4A. FIG. 4F shows more detail of some of the circuitry shown in FIG. 4A.

Specifically, FIG. 4F indicates more clearly how inductor current $I_L$ may be directed from inductor L through resonance capacitor $C_{RES}$, conductor 31, and resistor R to develop a voltage between the (+) and (−) inputs of comparator 35 so as to generate zero-crossing transitions of the signal ZERO_C when the direction of inductor current $I_L$ is reversed. The current comparator represented by comparator 35 in combination with resistor 37 has its (−) input connected to one terminal of resistor 37 through which the inductor current $I_L$ flows from $V_{IN}$ into inductor L. The (+) input of comparator 35 is connected to $V_{IN}$. Comparator 35 generates a transition of a zero-crossing output signal ZERO_C whenever the inductor current $I_L$ waveform crosses through zero in either direction. When $I_L$ negative, i.e., ZERO_C=0 and KICK is HI, switch SW3 is turned on. Also, the driver circuitry generates switch control signals SW1CTRL and SW2CTRL to control power MOSFETs that may be utilized as switches SW1 and SW2, respectively. Inverter 78 in FIG. 4F generates switch control signal SW3CTRL, which controls switch SW3, in response to the switch control signal SW2CTRL generated on conductor 38-2 by NOR gate 74B.

Also, the voltage-to-$T_{ON}$ circuitry 40 in FIG. 4F including error amplifier 34, switches 27 and 28, and capacitors 25 and 29 generates a voltage on conductor 26 that represents the difference between $V_{OUT1}$ and $V_{RES\_MIN}$. Switch 28 turns ON for a small time interval to sample $V_{RES}$ when $I_L$ has reached its minima, ie, when $I_L=0$, KICK is HI, and inductor current $I_L$ is about to go positive. Capacitor 29 stores the sampled voltage $V_{RES\_MIN}$. Switch 27 is turned on when KICK=LO=0 and resets amplifier 34 so that its input error is equal to zero. Amplifier 34 can be disabled when KICK=LO. Voltage-to-$T_{ON}$ conversion circuit 40 converts that difference voltage to a pulse of SW1CTRL having a duration $T_{ON}$. Conversion circuit 40 includes a P-channel transistor 40B having its source connected to $V_{DD}$ and its drain connected to a supply voltage terminal of an inverter 40C having its input connected to the output of a two-input AND gate 40A. The output of inverter 40C is connected to one terminal of a non-inverting buffer 40D and one terminal of a capacitor 40H having its other terminal connected to ground.

The P-channel transistor 40B in voltage-to-$T_{ON}$ conversion circuit 40 is utilized as a resistor, and it along with capacitor 40H function as an RC delay element. The channel resistance of transistor 40B is adjusted by the voltage of conductor 26. A higher voltage on conductor 26 causes transistor 40B to have to a higher resistance and therefore a longer RC delay is generated. The lower the voltage on conductor 26, the lower the resistance of transistor 40B, resulting in a lower RC delay. The voltage-to-$T_{ON}$ conversion circuit 40 thus converts the voltage on conductor 26 to a time delay interval. Inverter 40C acts as a switch to enable the charging of capacitor 40H through the resistance transistor 40B. The output of inverter 40C will rise from 0 volts to the threshold voltage of the buffer amplifier 40D. The time required for the output of inverter 40C to rise from 0 volts to the threshold of buffer amplifier 40D is the ON-time interval $T_{ON}$ for switch SW1. A supply voltage terminal of buffer 40D is connected to $V_{DD}$. The output of buffer 40D is connected to the clock input of a D-type flip-flop 40F. The D input of flip-flop 40F is connected to $V_{DD}$, and the reset input R of flip-flop 40F is connected to the output of a reset pulse generator 40E having its input connected to the output of AND gate 40A. The signal KICK produced by hysteresis comparator 33 is applied to one input of AND gate 40A. The other input of AND gate 40A is connected to the input of an inverter 40G and receives the zero-crossing signal ZERO_C. The output of inverter 40G is connected to one input of a two-input NOR gate 74B having its other input connected to the output of inverter 74A. The output of NOR gate 74B produces switch control signal SW2CTRL on conductor 38-2. The output of NOR gate 74B causes inverter 78 to generate switch control signal SW3CTRL.

Figure 5A:
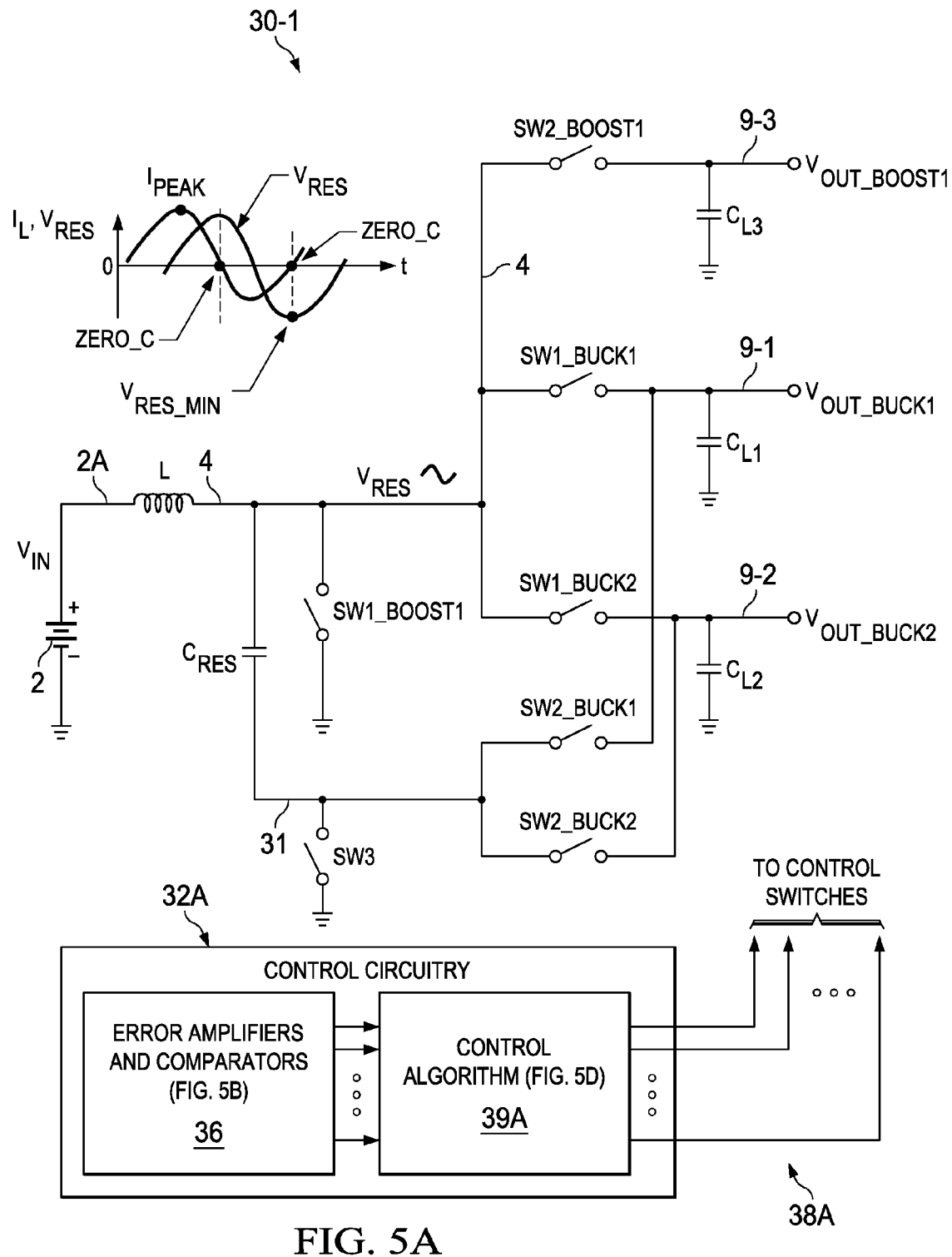
FIG. 5A is a schematic diagram of a resonant SIMO buck-boost DC-DC converter in accordance with the present invention.

FIG. 5A shows the basic topology of a resonant SIMO buck/boost DC-DC converter 30-1 that is based on the topology of resonant SISO buck converter 30 in FIG. 4A. The resonator circuit in FIG. 5A, which includes battery 2, inductor L, resonator capacitor $C_{RES}$, and switch SW3, may be connected essentially the same as in FIGS. 4A and 4F. Switch SW1_BUCK1 in FIG. 5A is the same as switch SW1 in FIG. 4A, and is connected by conductor 9-1 to generate an output voltage $V_{OUT\_BUCK1}$ across load capacitor $C_{L1}$. Switch SW2_BUCK1 in FIG. 5A is the same as switch SW2 in FIG. 4A, and also is connected to conductor 9-1. Furthermore, in FIG. 5A, a switch SW1_BUCK2 also may be connected between conductor 4 and an output conductor 9-2 which generates an output voltage $V_{OUT\_BUCK2}$ across a load capacitor $C_{E2}$, and a switch SW2_BUCK2 may be connected between conductor 31 and output conductor 9-2. Also, a switch SW1_BOOST1 is connected between conductor 4 and ground, and a switch SW2_BOOST1 is connected between conductor 4 and an output conductor 9-3 that applies a boosted output voltage $V_{OUT\_BOOST1}$ across another load capacitor $C_{L3}$. Additional buck outputs and boost outputs may be similarly provided as needed. "Pure resonance operation" waveforms (i.e., operation as if switches SW1, SW2, and SW3 are omitted) of the inductor current $I_L$ and the resonator voltage $V_{RES}$ are also shown in FIG. 5A.

The various switches in FIG. 5A are controlled by control circuitry 32A, which generates switch control signals 38A that are coupled to the control terminals (not shown) of each of switches SW1_BUCK1, SW1_BUCK2, SW2_BUCK1, SW2_BUCK2, and SW3 respectively. Control circuitry 32A includes various comparators (such as comparators 33 and 35) and error amplifiers (such as error amplifier 34) as shown in FIG. 5B. Control circuitry 32A also includes a control algorithm circuit 39, details of which are shown in FIG. 5D.

FIG. 5B shows the circuitry in block 36 in control circuit 32A of FIG. 5A. The circuitry in block 36 includes a comparator 33A having its (+) input connected to $V_{REF}$ and its (−) input connected to $V_{OUT\_BUCK1}$, and also includes another comparator 33B having its (+) input connected to $V_{REF}$ and its (−) input connected to $V_{OUT\_BUCK2}$. The (+) input of an error amplifier 34A is connected to the minimum $V_{RES}$ value $V_{RES\_MIN}$. The (−) input of error amplifier 34A is connected to $V_{OUT\_BUCK1}$. Another error amplifier 34B has its (+) input connected $V_{RES}$ value $V_{RES\_MIN}$ and its (−) input connected to $V_{OUT\_BUCK2}$.

FIG. 5C shows an arbitration control circuit 54 which also is shown in more detail in block 54 of subsequently described FIG. 5G. Arbitration control circuit 54 in FIG. 5C operates to generate an output priority variable PCC (Priority of Current Cycle) to produce either a "0" or a "1" for the present or current cycle of operation of the resonant SIMO and to generate an output priority variable PNC (Priority of Next Cycle) for the next cycle of operation of the resonant SIMO. A signal "USER-DEFINED PRIORITY" is applied as an input to arbitration control circuit 54. The signals KICK1 and KICK2 are applied as inputs to arbitration control circuit 54. For determining the value of PCC for the present cycle, the circuitry in block 55 of arbitration control circuit 54 sets PCC=0 if generation of $V_{OUT\_BUCK1}$ is a priority during the present operating cycle of the buck portion of resonant SIMO 30-1. Otherwise, i.e., if generation of $V_{OUT\_BUCK2}$ is a priority during the present operating cycle, then the circuitry in block 55 sets PCC="1". For determining the value of PNC, which is the value of PCC for the next cycle, the circuitry in block 56 of arbitration control circuit 54 sets PNC="1" if PCC changes from a "0" to a "1" or if PCC changes from a "1" to a "0" in the next cycle; and sets PNC="0" if PCC remains unchanged during the next cycle.

Figure 5D:
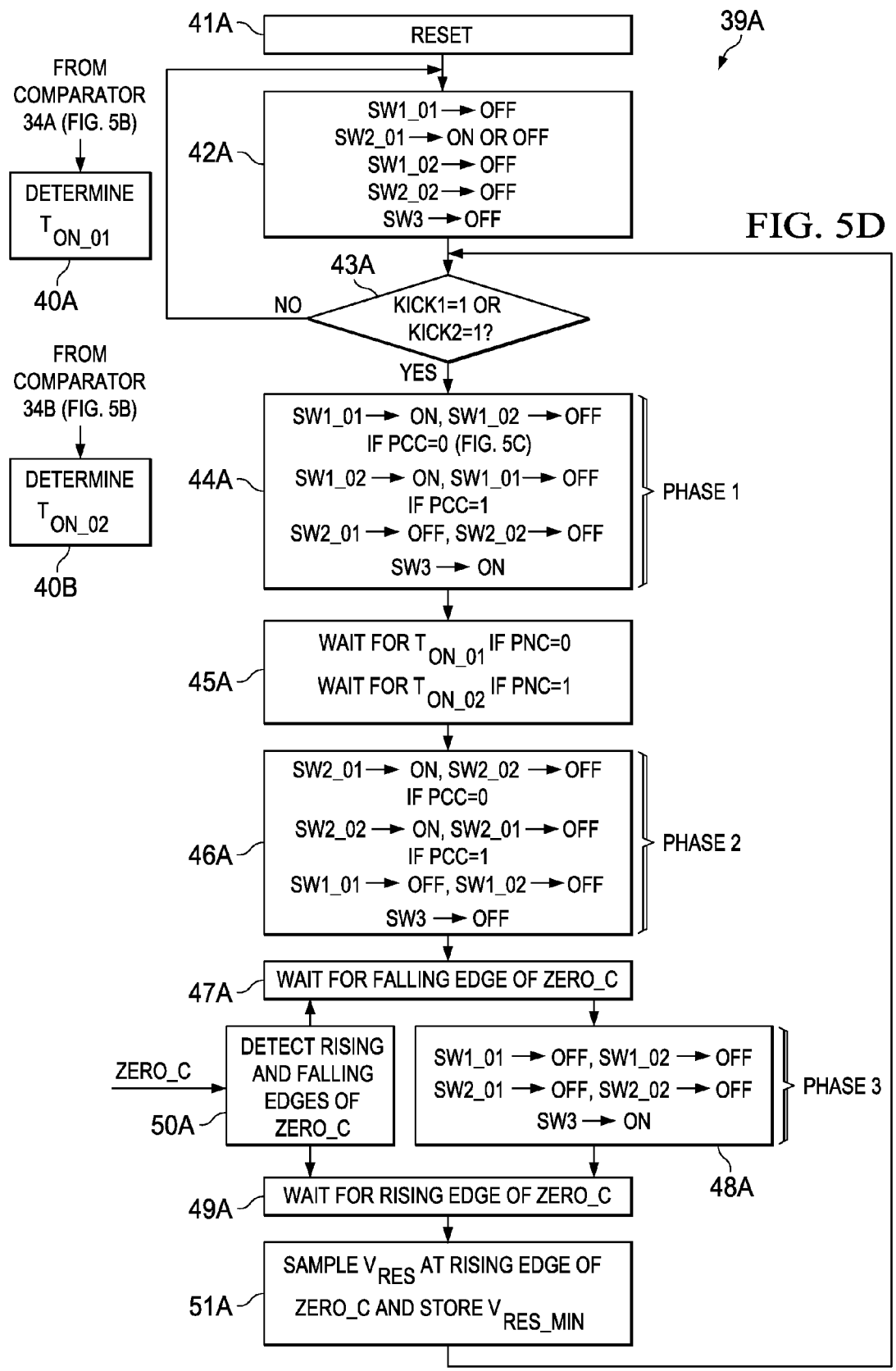
FIG. 5D is a flow diagram of the control algorithm in block 39A of FIG. 5A.

FIG. 5D shows a SIMO control algorithm corresponding to circuitry in block 39A in FIG. 5A. (Again, note that for convenience switches SW1_BUCK1, SW1_BUCK2, SW2_BUCK1, and SW2_BUCK2 of FIG. 5A are alternatively designated in the flow chart of FIG. 5D as SW1_01, SW1_02, SW2_01, and SW2_02, respectively.) In FIG. 5C, the control algorithm 39A is reset at the beginning of each cycle, as indicated in block 41A. As indicated in block 42A, at the beginning of each cycle switch SW1_01 is OFF, switch SW2_01 may be either ON or OFF depending on which channel is to be selected, switch SW1_02 is OFF, switch SW2_02 is OFF, and switch SW3 is OFF. Then, as indicated in decision block 43A, if the value of either KICK1 or KICK2 is equal to 1, then control algorithm 39A goes to block 44A at the beginning of Phase1 and (1) turns switch SW1_01 ON and turns switch SW1 OFF if PCC=0 (e.g., if $V_{OUT\_BUCK1}$ is to be serviced, see FIG. 5C), (2) turns switch SW1_2 ON and turns switch SW1_01 OFF if PCC=1 (e.g., if $V_{OUT\_BUCK2}$ is to be serviced, see FIG. 5C), and in either case turns switches SW2_01 and SW2_02 OFF, and turns switch SW3 ON. However, if the determination of decision block 43A is negative, the program goes back to block 42A and then back to decision block 43A.

Control algorithm 39A goes from block 44A to block 45A and waits an amount or duration of time equal to $T_{ON\_01}$ if PNC=0, or waits for an amount of time equal to $T_{ON\_02}$ if PNC=1, i.e., until the inductor current $I_L$ reaches a peak value $I_{PEAK}$. Next, at the beginning of Phase2, control algorithm 39A goes to block 46A and turns switch SW2_01 ON and turns switch SW2_02 OFF if PCC=0, or turns switch SW2_02 ON and turns switch SW2_01 OFF if PCC=1, and in either case turns switches SW1_01, SW1_02, and SW3 OFF. Next, at the end of Phase2, control algorithm 39A goes to block 47A and waits for the falling edge of ZERO_C. Control algorithm 39A then goes to block 48A at the beginning of Phase3 and allows switch SW1_01 to remain ON, and turns switches SW1_02 and SW2_01 OFF, and turns switch SW3 ON. Then, control algorithm 39A goes to block 49A and waits for the rising edge of ZERO_C, i.e., until the negative inductor current $I_L$ approaches a zero crossing as indicated in block 50A Then control algorithm 39A goes to block 51A. In block 51A, control algorithm 39A samples the value of $V_{RES}$ at a zero crossing point of a rising edge of inductor current $I_L$ and stores that minimum value $V_{RES\_MIN}$. ZERO_C is either a HI "1" level or a LO "0" zero level which is detected in accordance with the detecting performed by block 50A to indicate the times at which positive-going and negative-going transitions of ZERO_C occur. As indicated in block 50A, control algorithm 39A receives the zero current crossing comparator output ZERO_C and detects when its rising and falling edges occur. As in previously described control algorithm 39 of FIG. 4B, a rising edge of ZERO_C indicates when the inductor current $I_L$ switches direction from negative to positive and the falling edge of ZERO_C indicates when inductor current $I_L$ switches direction from negative back to positive. This ZERO_C transition information produced by current comparator 37,35 is utilized in accordance with blocks 47A and 49A to determine when to begin and end Phase3. The output of block 51A in FIG. 5D enters decision block 43A.

Figure 5E:
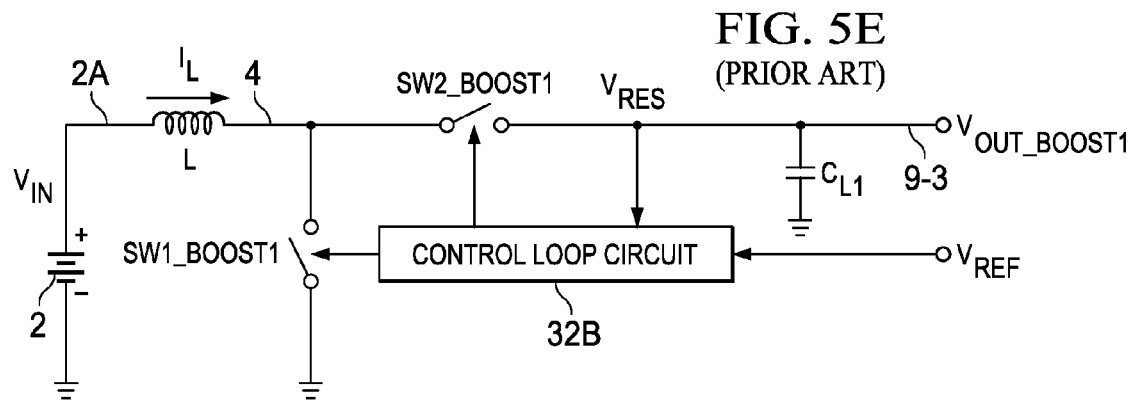
FIG. 5E shows a basic schematic diagram of a conventional boost converter.
Figure 5F:
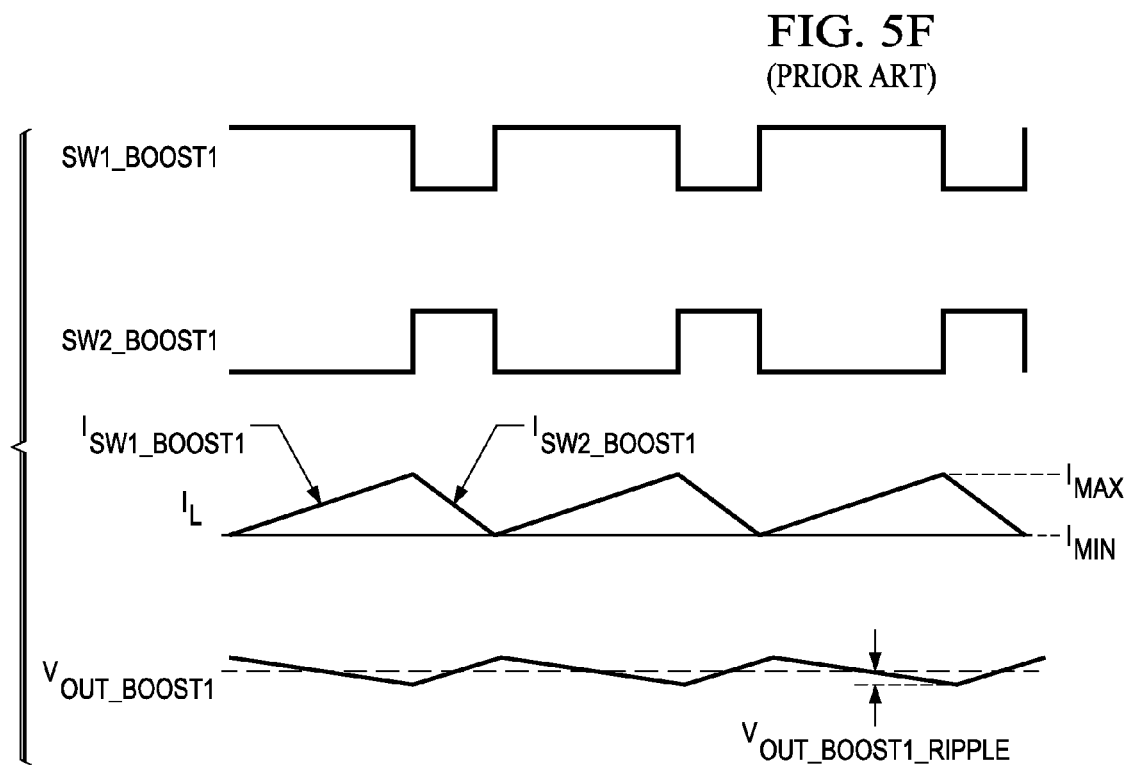
FIG. 5F shows voltage and current waveforms of the circuit of FIG. 5G.

Prior Art FIG. 5E shows a basic conventional boost converter which includes inductor L connected between $V_{IN}$ conductor 2A and $V_{RES}$ conductor 4, as in FIG. 5A. Switch SW1_BOOST1 is connected between conductor 4 and ground, and is controlled by a control loop circuit 32B in accordance with the waveforms shown in FIG. 5F. Switch SW2_BOOST1 is connected between conductor 4 and output conductor 9-3. Output conductor 9-3 also is connected to one terminal of load capacitor $C_{L1}$ and an input of control loop circuit 32B. The input voltage $V_{IN}$ on conductor 2A initially is higher than the voltage $V_{RES}$ on conductor 4. After the inductor current $I_L$ has been charged up or increased to a desired maximum level IMAX, inductor L acts as a high impedance current source. Switch SW1_BOOST1 is opened and switch SW2_BOOST1 is closed by control loop circuit 32B and the decreasing "charged up" inductor current $I_L$ flows into a load capacitor $C_{L1}$ to increase the output voltage $V_{OUT\_BOOST1}$ on conductor 9-3. The process is repeated under the control of control loop circuit 32B to cause $V_{OUT\_BOOST1}$ to be equal to the reference voltage $V_{REF}$. Control circuit 32B begins each new cycle by turning switch SW2_BOOST1 off and turning switch SW1_BOOST1 on. $V_{REF}$ may be substantially higher than the input voltage $V_{IN}$. A relatively small ripple voltage $V_{OUT\_BOOST1\_RIPPLE}$ is superimposed on $V_{OUT\_BOOST1}$, as shown in the $V_{OUT\_BOOST1}$ waveform.

Figure 5G:
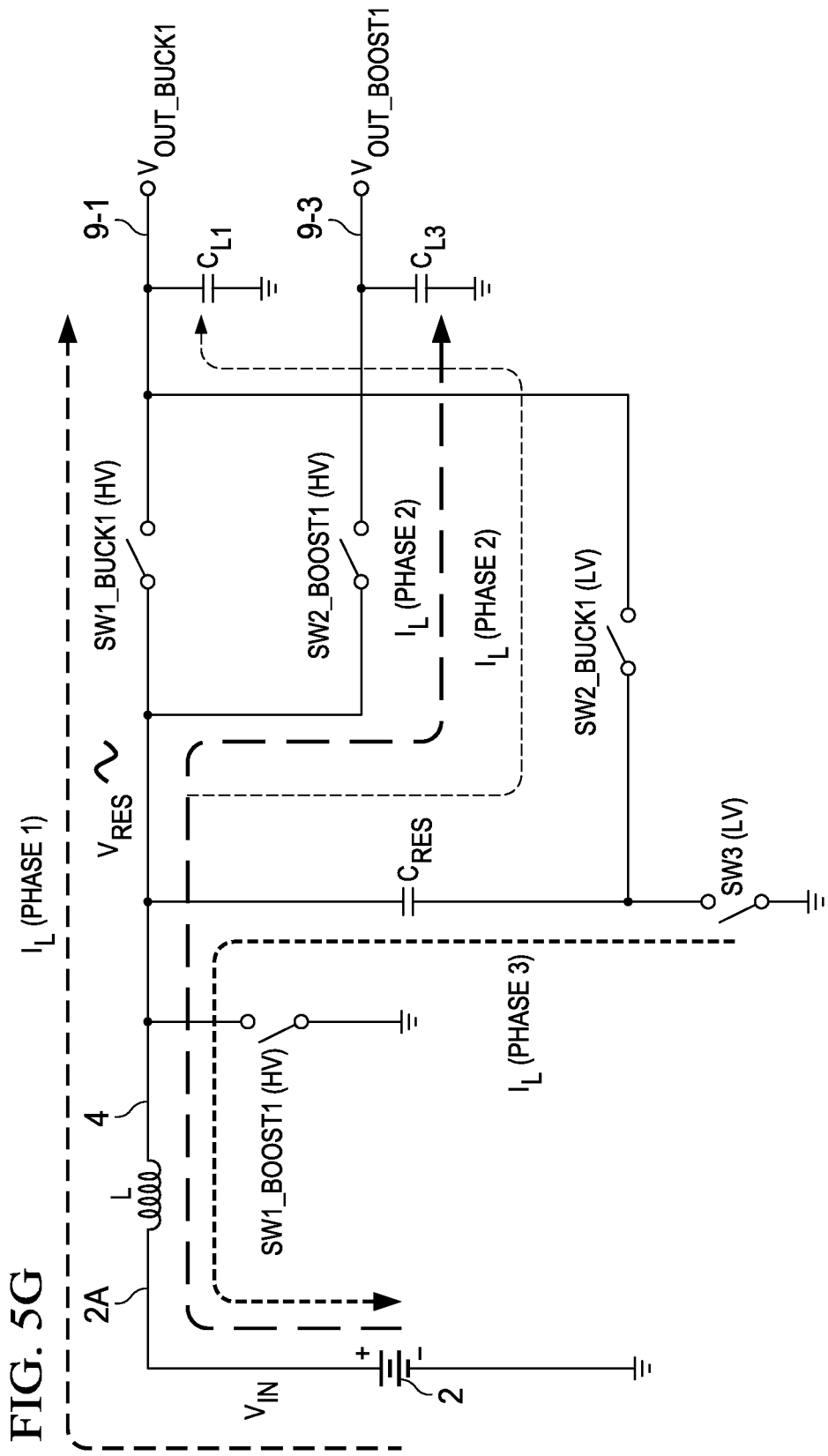
FIG. 5G is a schematic diagram useful in understanding the operation of the buck portion of the SIMO buck-boost converter of FIG. 5A.
Figure 5H:
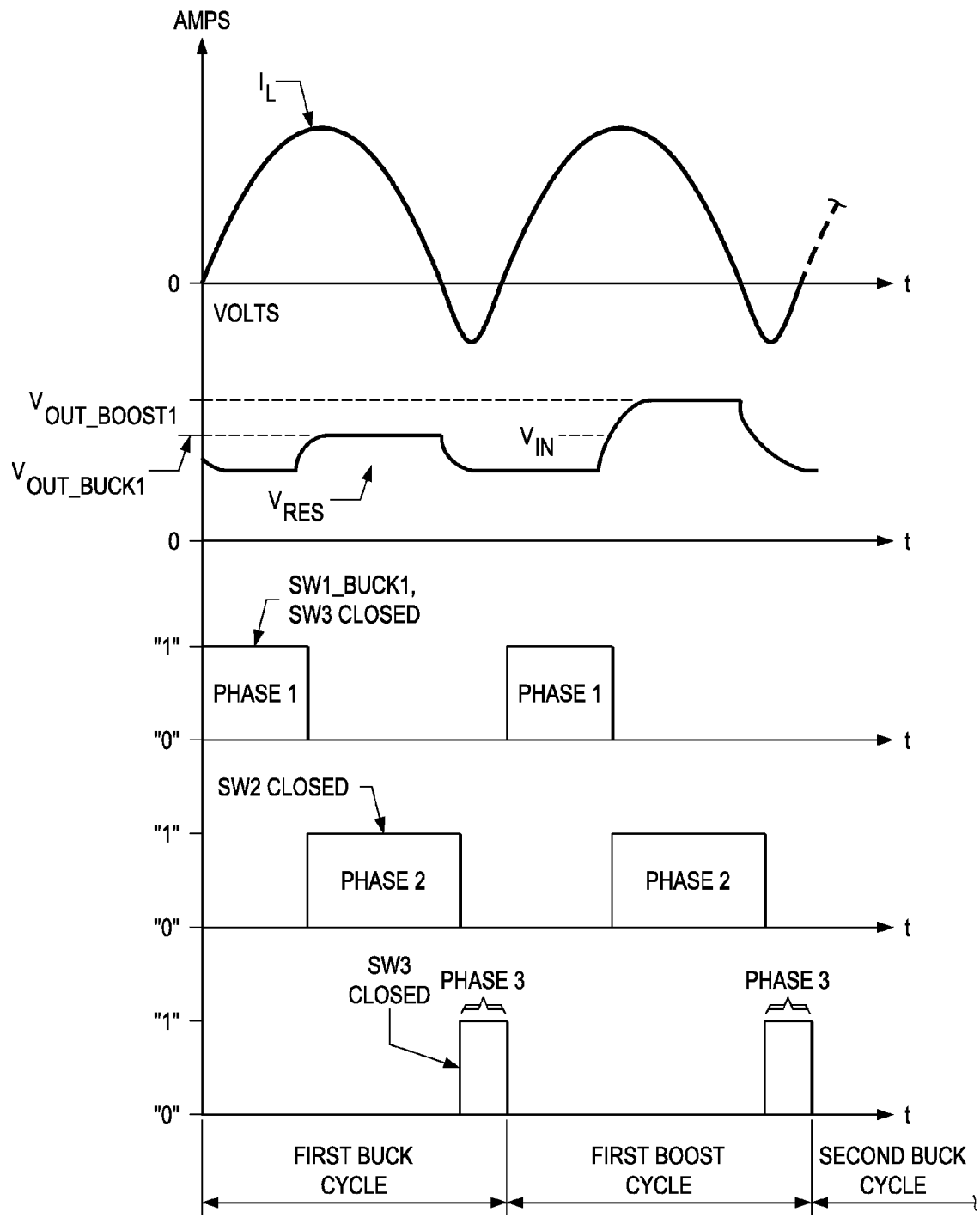
FIG. 5H is a timing diagram useful in understanding the operation of the circuitry shown in FIG. 5G.

FIG. 5G shows a simplified portion of FIG. 5A including only inductor L, resonator capacitor $C_{RES}$, switches SW1_BUCK1, SW1_BOOST1, SW2_BOOST1, SW2_BUCK1, and SW3, and output capacitors $C_{L1}$ and $C_{L2}$, for the purpose of illustrating buck/boost operation. FIG. 5H shows waveforms of inductor current $I_L$ and the voltage signal $V_{RES}$ in FIG. 5G and also shows the timing of Phase 1, Phase 2, and Phase 3 relative to the $I_L$ and $V_{RES}$ waveforms. In the simplified SIMO buck/boost circuitry shown in FIG. 5G, there are 2 outputs, $V_{OUT\_BUCK1}$ (output voltage $V_{OUT\_BUCK1}$ being less than input voltage $V_{IN}$) and $V_{OUT\_BOOST1}$ (output voltage being more than input voltage $V_{IN}$). (The circuit shown in FIG. 5E can be re-configured to generate as many buck outputs and as many boost outputs as needed by a particular application. Buck-boost converter 30-1 in FIG. 5A, which shows 2 buck outputs ($V_{OUT\_BUCK1}$ and $V_{OUT\_BUCK2}$) and 1 boost output ($V_{OUT\_BOOST1}$), is just one example of such a configuration.)

In the simplified buck/boost DC-DC converter circuitry shown in FIG. 5G, switches SW1_BUCK1, SW2_BUCK1 and SW3 along with the resonator components (L and $C_{RES}$) operate in the same way as previously described to generate output voltage $V_{OUT\_BUCK1}$ when it is lower than the input voltage $V_{IN}$. Switches SW1_BOOST1 and SW2_BOOST1 along with inductor L operate just as in a conventional boost converter to generate output voltage $V_{OUT\_BUCK1}$ is higher than the input voltage $V_{IN}$.

Buck and boost modes of operation of the buck/boost converter of FIG. 5G is indicated by the waveforms of FIG. 5H which are similar to the buck converter waveforms of previously described FIG. 4C except for the shape of the $V_{RES}$ waveform. The waveforms of FIG. 5H show alternating buck and boost cycles. Also, boost-only operation can be achieved by keeping switch SW3 continuously ON or closed so that only the boost portion of the circuitry is operating and the book portion is switched off.

Figure 5I:
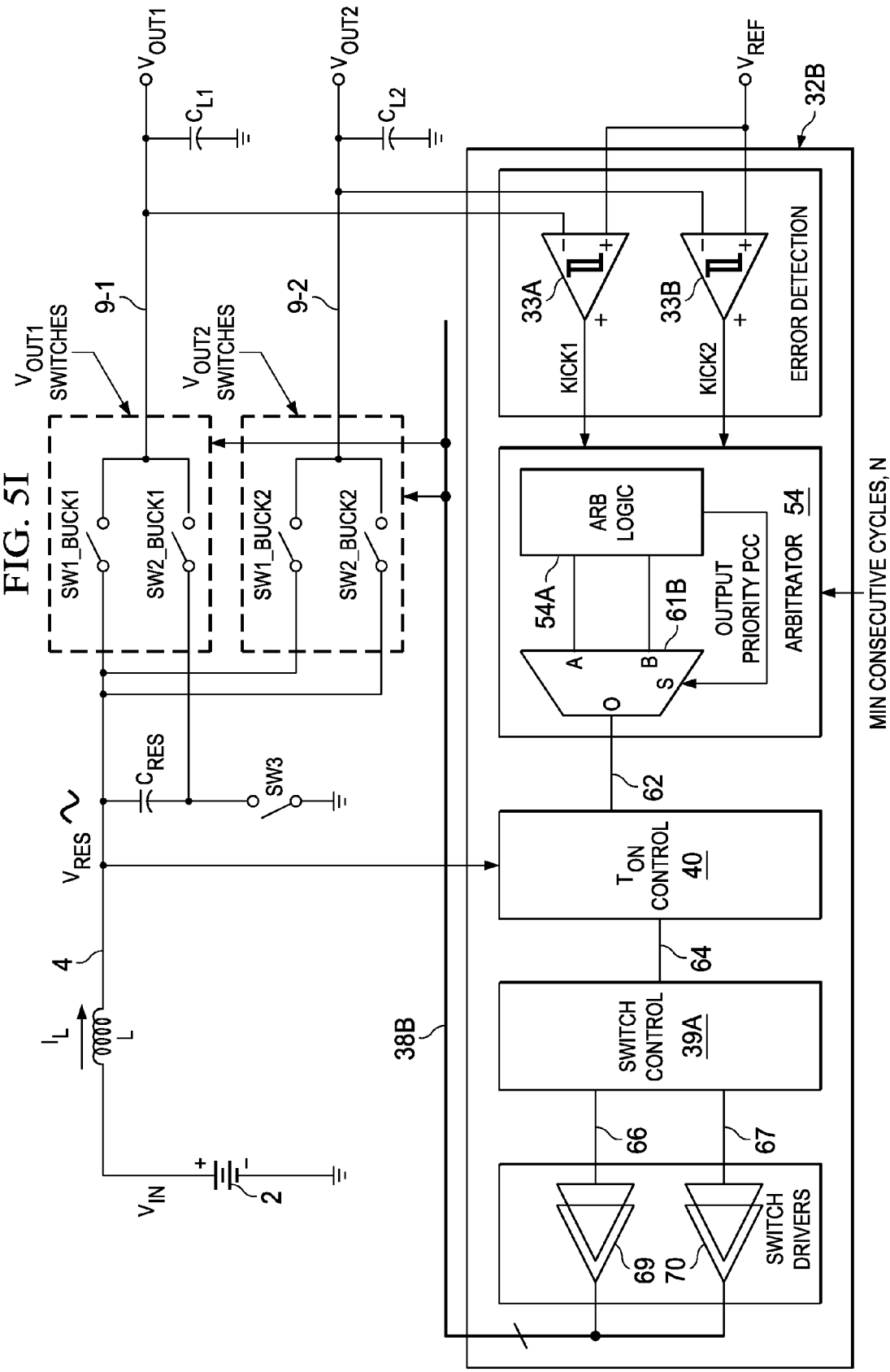
FIG. 5I is a diagram including the overall control circuit structure for the buck portion of the SIMO buck-boost converter of FIG. 5A.

FIG. 5I is a diagram including the overall control circuit structure, including details of arbitration circuit 54 that may be included in the buck portion of the SIMO buck-boost converter of FIG. 5A. In FIG. 5I, the illustrated SIMO buck converter circuitry includes most of the simplified circuit shown in FIG. 5A but for convenience omits the two boost switches SW1_BOOST1 and SW2_BOOST1, but includes a more complex illustration of control circuit 32B. Control circuit 32B in FIG. 5I includes two error detection comparators 33A and 33B each having suitable hysteresis and each having a (+) input connected to $V_{REF}$. The (−) input of comparator 33A is connected to $V_{OUT1}$ and the (−) input of comparator 33B is connected to $V_{OUT2}$. The outputs KICK1 and KICK2 of comparators 33A and 33B, respectively, are connected to inputs of an arbitration circuit 54 including arbitration logic 54A (which is the same as arbitration control circuitry 54, 55, 56 in FIG. 5C) and a multiplexer 61B.

The signals KICK1 and KICK2 indicate when $V_{OUT1}$ and $V_{OUT2}$ need to be charged. The user-provided priority inputs PCC and the user-provided "weighting ratio N" establish the priorities between relative amounts of charging required by $V_{OUT1}$ and $V_{OUT2}$ in order to appropriately service $V_{OUT1}$ and $V_{OUT2}$ according to their respective needs. The output of multiplexer 61B is coupled by conductor 62 to an input of a voltage-to-$T_{ON}$ conversion circuit such as circuit 40 shown in FIG. 4F, which has another input connected by conductor 4 to receive $V_{RES}$. $T_{ON}$ is the duration of the charging of inductor L to generate the desired level of inductor current $I_L$. The output of $T_{ON}$ control circuit 40 is connected by conductor 64 to an input of a switch control circuit 39A, which corresponds to the switching algorithm 39A of FIG. 5D. The outputs of switch control algorithm circuit 39A are connected by conductors 66 and 67 to switch drivers 69 and switch drivers 70, respectively. The outputs of switch drivers 69 and 70 are connected by appropriate conductors 38B to the control terminals of the various switches (e.g., to the gate electrodes of various MOS switch transistors used to implement the various switches in the SIMO circuit.)

It is to be emphasized that the resonant DC-DC converters of FIGS. 4A and 5A do not include any input switches connected to the DC input $V_{IN}$, as is the case in the DC-DC converters of the above mentioned Jabbari and Shalahami references and the standard DC-DC buck converters having input switches that control the energy flow into inductor L from $V_{IN}$ and battery 2. In contrast, in the described embodiments of the invention, it is shown that the energy flow between input voltage $V_{IN}$ and battery 2 and an output voltage such as $V_{OUT1}$ or $V_{OUT\_BUCK1}$ in FIG. 5D is achieved by controlling only the output switches such as SW1 or SW1-BUCK1, and further improvements in energy efficiency are achieved by utilizing ZCS and ZVS switching.

Figure 3A:
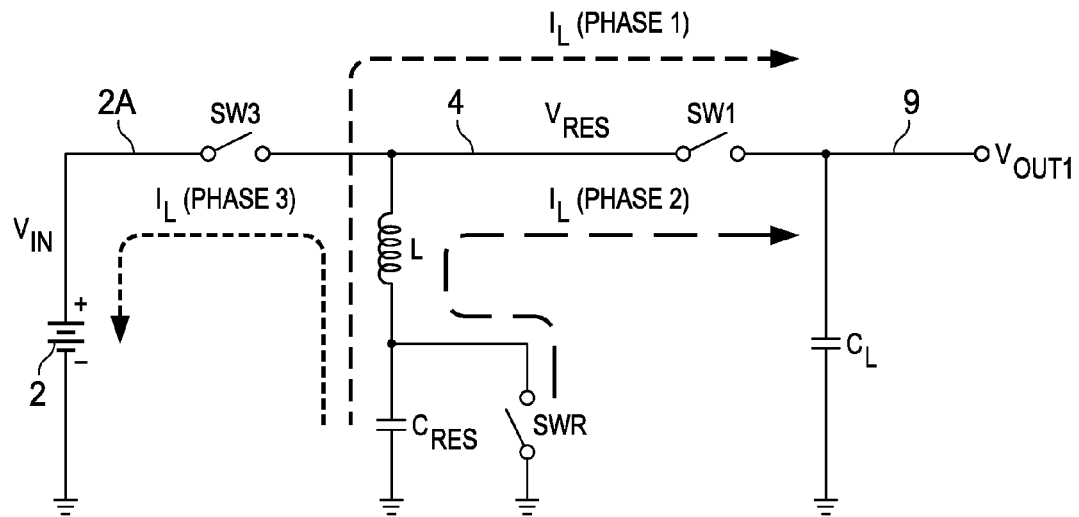
FIG. 3A is a schematic diagram of a known buck-G SwRC DC-DC converter.
Figure 3B:
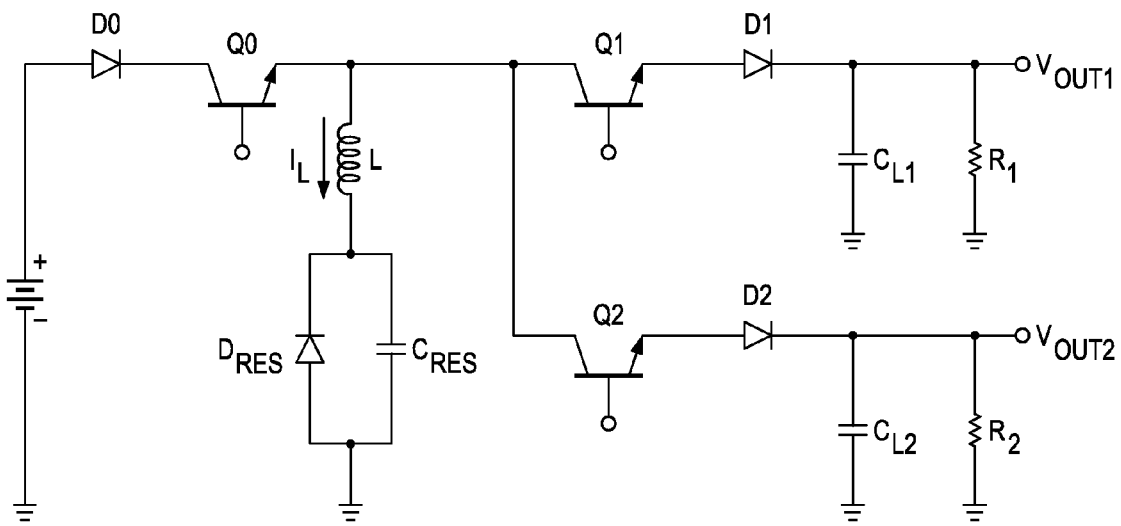
FIG. 3B is a schematic diagram of a known double-output buck-G SwRC DC-DC converter.
Figure 3C:
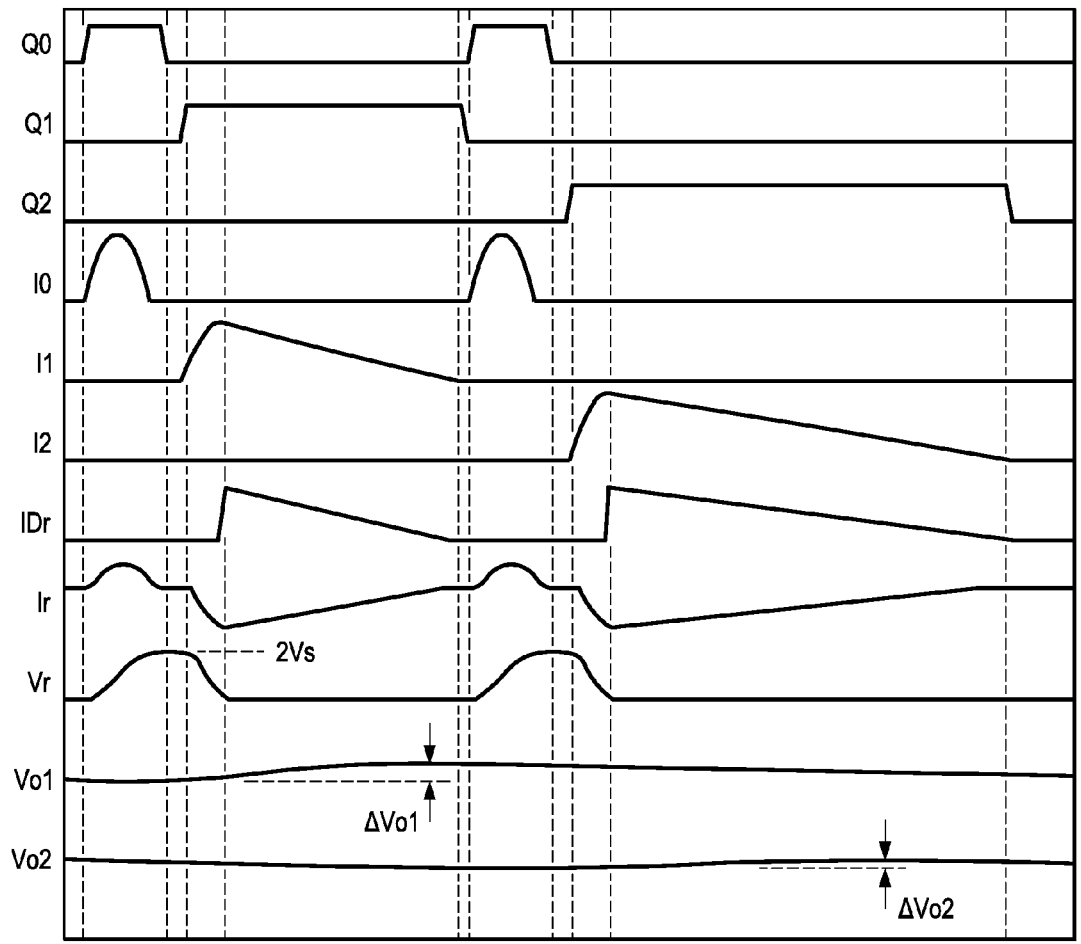
FIG. 3C is a timing diagram illustrating steady-state waveforms of the circuit of FIG. 3B.
Figure 3C:
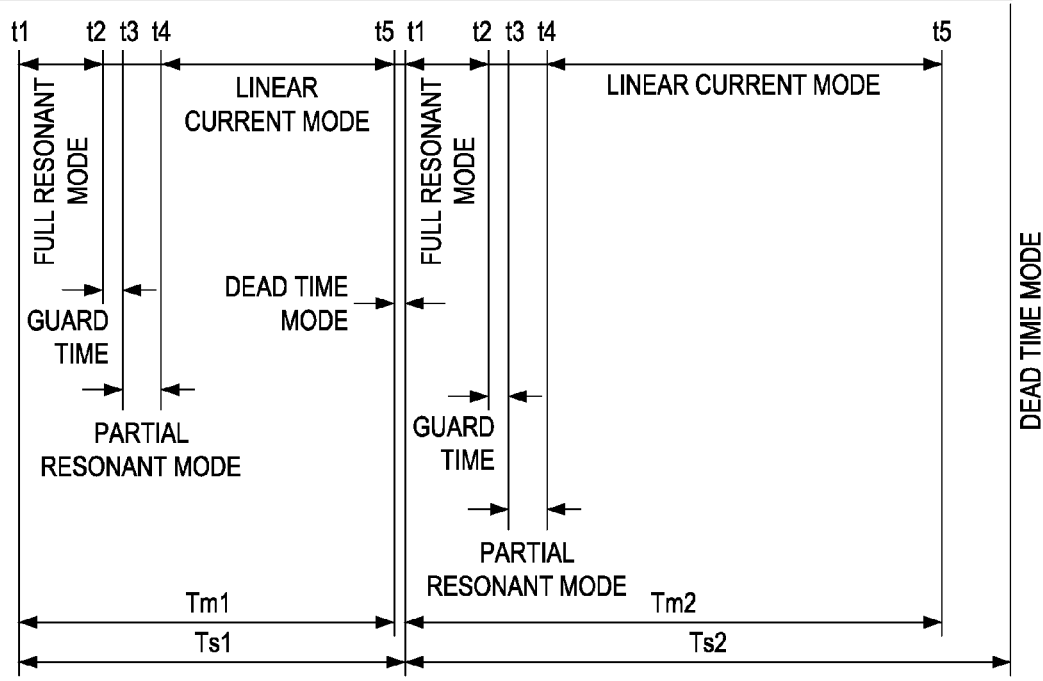

During Phase 1, the resonant DC-DC converters of FIGS. 4A and 5A achieve both ZVS (zero voltage switching) and ZCS (zero current switching), whereas the resonant DC-DC converter of Prior Art FIGS. 3A and 3B can achieve only ZCS (zero current switching). Furthermore, all of the switches in Prior Art FIGS. 3A and 3B must be high-voltage-rated transistor switches, which necessarily are much larger, slower, and more expensive than lower-voltage-rated transistor switches used in the circuits of FIGS. 4A and 5A. For example, switch SWR in FIG. 3A must be rated at $2 \times V_{IN}$ volts, and switches SW1 and SW3 must be rated at $V_{IN}$ volts.

The "switching FOM (figure of merit)" or Rsp metric of a transistor indicates how much energy is consumed by the transistor during its switching operation. Better FOM means lower energy dissipated per switching activity. A low-volt-rated transistor can switch at a frequency that is roughly 6 times higher frequency than a high-voltage 3 volt-rated transistor having the same power loss. It should be appreciated that there is a significant difference between the "Rsp" FOM of a transistor which can withstand a voltage difference of 3.0 volts between its drain and source terminals (i.e., a 3.0 volt-rated transistor) and a transistor which can withstand a difference of 1.2 volts between its drain and source terminals (i.e., a 1.2 volt-rated transistor). Lower Rsp of a transistor indicates that it occupies less silicon area for realizing a given switch resistance as compared to the chip area occupied by a higher Rsp transistor. The Rsp of 3 volt-rated transistor is roughly 16 times that of a 1.2 volt-rated transistor, and that indicates the amount which the transistor size and cost can be reduced by using low-voltage (LV) 1.2 volt-rated transistors instead of high-voltage (HV) 3 volt-rated transistors. Also, a low-voltage-rated transistor has a better "switching FOM" than that of a high-voltage-rated transistor.

If a high-voltage transistor in an integrated circuit can be replaced with a low-voltage transistor, the integrated circuit can be operated at roughly 6 times higher frequency without increasing the power loss therein, and also occupies less silicon chip area. This high frequency operation in turn may allow external passive devices such as inductors and capacitors to be correspondingly smaller. The higher voltage rating required for the transistor switches in the Jabbari and Shalahami references (Prior Art FIGS. 3A and 3B herein) decreases the power loss switching FOM (figure of merit) of those transistors and therefore also decreases the power efficiency of the illustrated resonant DC-DC converters. In contrast, the resonant DC-DC converters of FIGS. 5A and 5B allow 2 of the 3 main switches to be low-voltage-rated transistors, which have superior switching power loss FOMs. This allows higher frequency circuit operation, allows use of smaller external inductors and capacitors, results in improved power efficiency, and provides higher output power density. (The "power density" of a power converter indicates the maximum amount of power that can be transferred from an input source to an output in a given "solution volume" (i.e., electronics-occupied volume or region) at a given efficiency. Higher "power density" would mean higher power delivery in a given solution volume as compared to the power delivery in the same amount of "solution volume" for a converter having lower "power density".)

During Phase2, the current path in the resonant DC-DC converter in Prior Art FIG. 3A from the input voltage $V_{IN}$ to load capacitor $C_{L1}$ must pass through two series-coupled transistor switches SW3 and SW1, while the current in the resonant DC-DC converters shown in FIGS. 4A and 5A require use of only one transistor switch, i.e. the selected output switch such as SW1 or SW2 in FIG. 4A or SW1_BUCK1, SW2_BUCK1, or SW2_BOOST1 in FIG. 5B. This results in lower power loss in the switches due to the lower number of switches used in the described DC-DC converter architectures.

During Phase 3 the direction of inductor current $I_L$ is reversed or "negative" so that the destination of the charge being supplied by inductor current $I_L$ differs in the architectures of FIGS. 4A and 5A. The proposed solutions of FIGS. 4A and 5A return charge on resonant capacitor $C_{RES}$ across nodes 4 ($V_{RES}$) and ground to $V_{IN}$ during the resonant mode, whereas in FIGS. 3A and 3B current is sourced from $V_{IN}$ to the resonant capacitor $C_{RES}$ during this phase. This difference in direction of the charge supplied by inductor current $I_L$ during this phase allows the resonant DC-DC converters of FIGS. 4A and 5A to omit the input switch transistors that are required in the prior art.

The absence of any input switches in the described embodiments of the invention connects inductor L directly in series with the input voltage source $V_{IN}$. In contrast, in a prior art monolithic chip implementation of a DC-DC power converter having the usual input switches, the package and its lead frame and the on-board (i.e., on a printed circuit board) parasitic routing inductance create high frequency voltage "ringing" (i.e., voltage noise) at the input $V_{IN}$ on the printed circuit board as well as on the integrated circuit chip whenever the DC current through an input switch is switched as in the prior art. This limits the power efficiency, frequency of operation, and EMI (Electromagnetic Interference) performance of the prior art DC-DC converters, and to limit these adverse effects, a large amount of input decoupling effort must be applied to the printed circuit board design as well as to the integrated design, but nevertheless usually results in increased area and increased overall product volume and therefore also increases total product cost.

In contrast, the described embodiments of the invention have no input switches and the inductor L is connected directly in series with the input voltage source $V_{IN}$, so there is no need to switch for commute a DC current at the DC-DC converter input $V_{IN}$. This is important because much less input voltage noise (EMI) is generated at $V_{IN}$ during the DC-DC converter operation. Consequently, input decoupling capacitor requirements for the printed circuit board and the prior art integrated circuit DC-DC converter chip are substantially reduced for the described embodiments of the invention, as are the package, package lead frame, and print circuit board routing parasitic inductances. This means that a cheaper package (with larger parasitic inductance) can be used for the described DC-DC converters, which further reduces the total product cost.

The new resonant DC-DC buck converter architectures described herein provide an order of magnitude lower EMI transient voltages on the DC-DC converter $V_{IN}$ input terminal than the EMI transient input voltages of prior DC-DC buck converters caused by fast switching of their input switches connected to various internal parasitic inductances. A substantial advantage of this is that much less expensive packages can be used for the described DC-DC converters.

Figure 6:
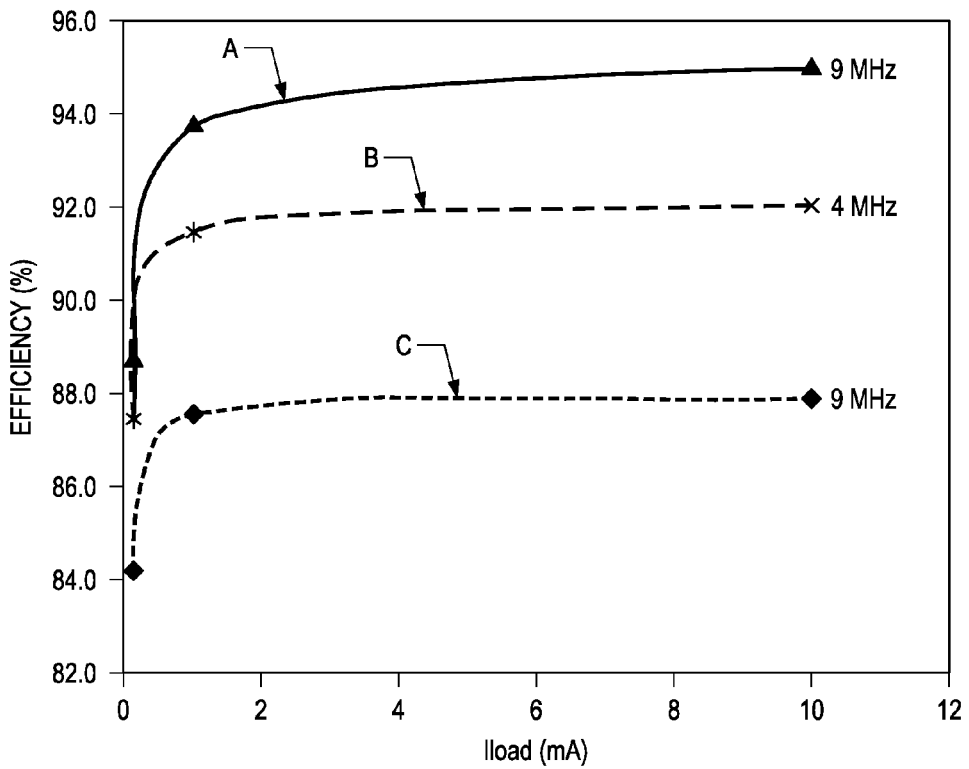
FIG. 6 is a graph indicating power efficiency versus load current for a SIMO DC-DC converter in accordance with the present invention and a somewhat comparable prior art SISO.

Referring to the graph of FIG. 6, curves B and C show the power efficiency versus load current characteristic for a resonant DC-DC converter as shown in FIGS. 4A and 4B at the frequencies of 4 MHZ and 9 MHZ, respectively. Prior resonant SIMO DC-DC converter power efficiency usually is at least 2-4% lower than for resonant SISO DC-DC converters, due mainly to the presence of an input power transistor, two bonding wire parasitic resistances, and losses associated with cross regulation control in SIMO DC-DC converters.

Figure 7:
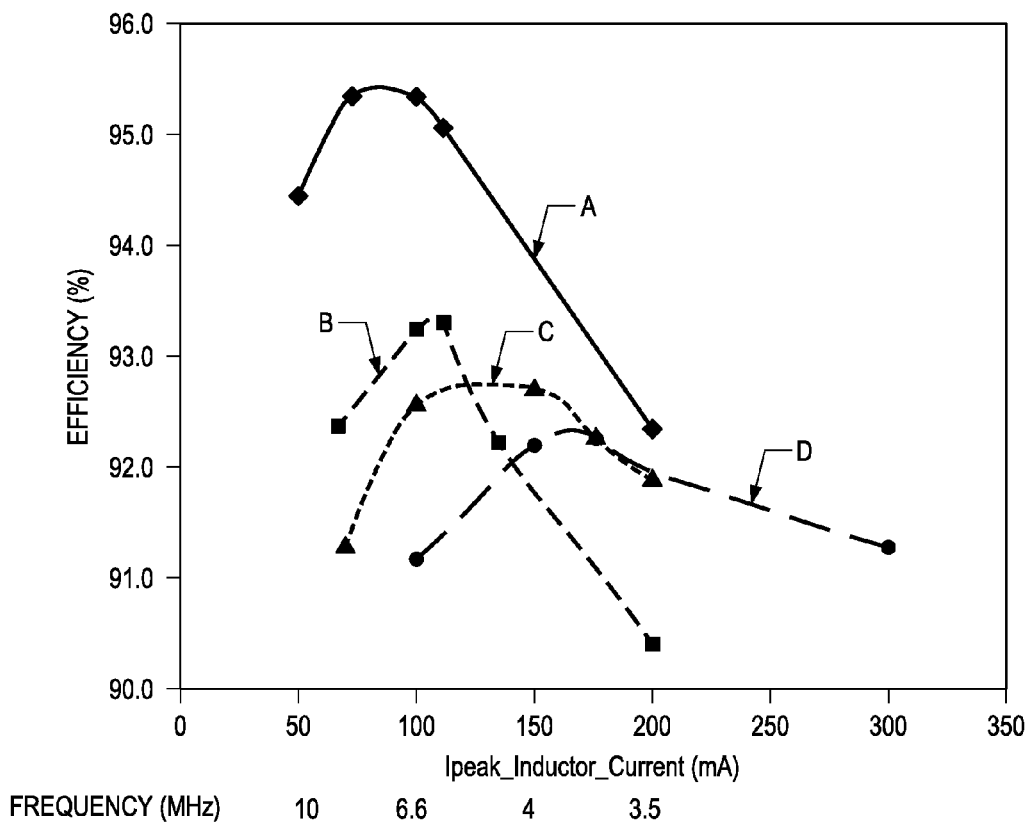
FIG. 7 is a graph indicating power efficiency versus peak inductor current and decreasing frequency for a SIMO DC-DC converter in accordance with the present invention and a somewhat comparable prior art SISO.

Curve A in FIG. 6 shows the power efficiency versus load current characteristic for the a resonant SIMO DC-DC converter 30-1 in FIG. 5A. This curve shows a 3% higher, rather than lower, power efficiency versus load current characteristic than prior art resonant SISO DC-DC converter as shown in FIG. 3A. This is somewhat unexpected, because were nearly the switching power losses of a DC-DC converter increases as its operating frequency increases. But curve A in FIG. 7 shows that SIMO DC-DC converter 30-1 of FIG. 5A, rather than lower, has higher power efficiency characteristic than a standard DC-DC regulator. However, it is believed that the higher power efficiency of SIMO DC-DC converter 30-1 of FIG. 5A results from using the low-voltage-rated transistor switches instead of high-voltage transistor switches.

Referring to the simulated curves A and B in FIG. 7 showing the power efficiency as a function of peak inductor current and switching frequency for the resonant DC-DC converter architectures shown in FIGS. 4A and 5A are shown along with corresponding simulated curves C and D for prior art resonant DC-DC converter architectures shown in Prior Art FIGS. 3A and 3B. Curves A and B show that for same load current, the peak efficiency of the resonant SISO and SIMO DC-DC converters in FIGS. 4A and 5A, respectively, occur at roughly half of the inductor peak current, at roughly double the switching frequencies, of the previously discussed prior art SIMO and SISO DC-PC converter architectures, respectively, shown in Prior Art FIGS. 3A and 3B. This confirms the benefit of using the low-voltage-rated transistor switches in the resonant DC-DC converters shown in FIGS. 4A and 5A. It can be seen that the power efficiency peaks for simulated curves A and B occur at substantially higher switching frequencies than is the case for the conventional resonant DC-DC converters represented by simulated curves C and D. The use of low-voltage-rated transistor switches in place of the high-voltage-rated transistors required by the prior art resonant DC-DC converters may allow use of higher switching frequencies and consequently may allow use of smaller, less expensive inductors reduced chip sizes, and lower costs.

Figure 8:
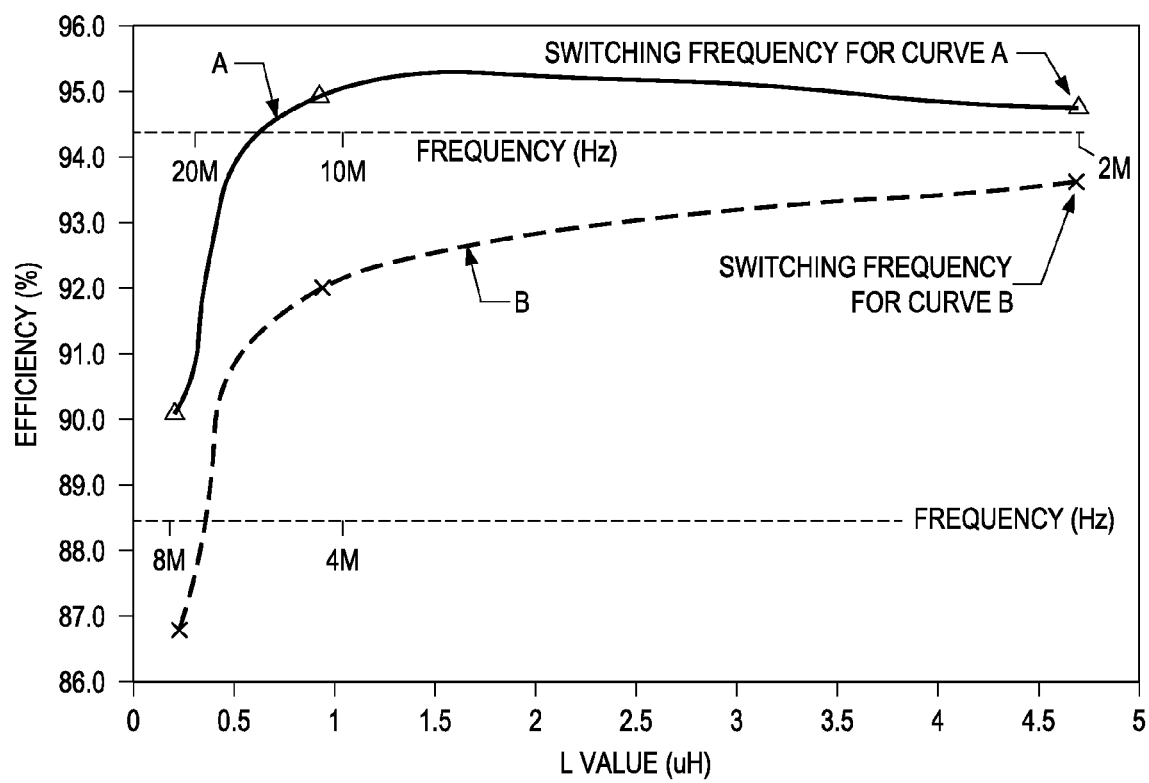
FIG. 8 is a graph indicating power efficiency versus inductor value and decreasing frequency for a SIMO DC-DC converter in accordance with the present invention and a somewhat comparable prior art SISO.

Referring to FIG. 8, simulated curves A and B indicate how the power efficiency of the resonant DC-DC converters of FIGS. 4A and 5A vary as a function of the inductance L and the switching frequency and how it compares with power efficiency of prior DC-DC converters as shown in Prior Art FIGS. 3A and 3B. The power efficiency of the DC-DC converters of FIGS. 4A and 5A remains much higher with increasing switching frequency than the power efficiency of the resonant DC-DC converters of FIGS. 3A and 3B. For curve A, the rolloff of the power efficiency of the resonant DC-DC converters of FIGS. 4A and 5A is a function of increasing switching frequency occurs at approximately 20 MHZ, whereas the corresponding power efficiency rolloff for curve B occurs at approximately 8 MHZ for the resonant DC-DC converters of Prior Art FIGS. 3A and 3B. That is, the power efficiency rolloff for the resonant DC-DC converters FIGS. 4A and 5B is roughly 3 times higher than the corresponding rolloff for the resonant DC-DC converters of FIGS. 3A and 3B. This may make it practical to integrate the inductor into the same integrated circuit chip as the rest of the DC-DC converter, especially if a magnetic core is provided. Even if the inductor is external, it may be smaller and less expensive.

Advantages of resonant DC-DC converters according to the present invention compared to prior DC-DC converters include providing book and boost resonant DC-DC converter operation without use of input switches and thereby avoiding various disadvantages associated with input switches, including power loss and EMI (electromagnetic interference) normally associated with input switches such as power loss in the input switches, lower frequency operation due to lower switching FOM of input switches, EMI (electromagnetic interference), larger area and cost due to input decoupling needs, and sensitivity to package parasitics. The described embodiments of the invention provide both zero voltage switching (ZVS) and zero current switching (ZCS) to reduce dynamic switching losses. As a result of ZCS switching, the current delivered to any of the output at the beginning of the cycle starts at zero. This means that error at a at a particular DC-DC converter output does not affect another output.

Furthermore, the voltage rating of the LV transistors is independent of $V_{IN}$ and can be scaled as a function of the output voltage. This allows higher efficiency, lower total cost, and high frequency operation. This is in contrast to the prior art in which the input voltage establishes the required voltage rating of the transistors. Furthermore, the new multi-phase charging scheme through one or more capacitors enables full control of the resonator energy in response to the amount of direct output loading.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, some integrated circuit inductors have ferrite cores, for example magnetic cores built as a passive device up on top of the semiconductor wafer. Such integrated circuit ferrite cores may achieve very good values of inductance, e.g., between 100 nanohenrys and 1 microhenry on a 4 millimeter by 4 millimeter chip. Use of such integrated circuit ferrite cores could make the present invention even more advantageous. Either or both of the inductor L and the resonance capacitor $C_{RES}$ may be on-chip or off-chip.

What is claimed is:

1. A resonance-based DC-DC converter for converting a DC input voltage to a first DC output voltage on a first output conductor, comprising:
   (a) an inductor having a first terminal directly coupled to a source of a DC input voltage and a second terminal coupled to a resonance conductor;
   (b) a resonance capacitor having a first terminal coupled to the resonance conductor;
   (c) a first switch coupled between the resonance conductor and the first output conductor, for conducting inductor current into the first output conductor during a first phase;
   (d) a second switch coupled between a second terminal of the resonance capacitor and the first output conductor, for conducting inductor current through the resonance capacitor into the first output conductor during a second phase; and
   (e) a third switch coupled between the second terminal of the resonance capacitor and a first reference voltage for conducting inductor current from a source of the first reference voltage through the resonance capacitor into the source of the input voltage during a third phase.

2. The resonance-based DC-DC converter of claim 1 wherein the first, second, and third switches are unidirectional switches.

3. The resonance-based DC-DC converter of claim 1 wherein none of the first, second, and third switches operates as an input switch of the resonance-based DC-DC converter.

4. The resonance-based DC-DC converter of claim 1 wherein the inductor is external to an integrated circuit chip in which the first, second, and third switches are located.

5. The resonance-based DC-DC converter of claim 1 including control circuitry for controlling the first, second, and third switches in accordance with the first, second, and third phases, wherein the first, second, and third phases are non-overlapping.

6. The resonance-based DC-DC converter of claim 5 wherein the control circuitry closes the first and third switches and opens the second switch during the first phase, opens the first and third switches and closes the second switch during the second phase, and causes the first switch to remain open, opens the second switch, and closes the third switch during the third phase.

7. The resonance-based DC-DC converter of claim 6 wherein the control circuitry includes a first comparator for detecting when the first output voltage is less than a minimum level representative of a second reference voltage to generate a first level of a first signal which causes the control circuitry to control the first, second, and third switches so as to cause the inductor current to charge a first load connected to the first output conductor, the first comparator also detecting when the first output voltage is greater than a maximum level representative of the second reference voltage to generate a second level of the first signal which causes the control circuitry to control the first, second, and third switches so as to prevent the inductor current from further charging the first load.

8. The resonance-based DC-DC converter of claim 7 wherein the control circuitry includes comparing circuitry for detecting zero-crossing occurrences of the inductor current for to determine times at which the first and third switches need to be closed and times at which the second switch needs to be open.

9. The resonance-based DC-DC converter of claim 8 wherein the control circuitry includes an error amplifier for comparing the first output voltage with a minimum level of a resonance voltage of the resonance conductor to generate a difference signal representative of a difference between the first output voltage and the minimum level of the resonance voltage, and wherein the control circuitry also includes voltage-to-delay conversion circuitry for converting the difference signal to a time duration during which the first switch is closed during the first phase.

10. The resonance-based DC-DC converter of claim 5 wherein the control circuitry operates to perform zero voltage switching (ZVS) and zero current switching (ZCS) of the first and second switches.

11. The resonance-based DC-DC converter of claim 5 including
   a fourth switch coupled between the resonance conductor and a second output conductor, for conducting inductor current into the second output conductor during the first phase; and
   a fifth switch coupled between the second terminal of the resonance capacitor and the second output conductor, for conducting inductor current through the resonance capacitor into the second output conductor during the second phase, whereby the resonance-based DC-DC converter converts the DC input voltage to a second DC output voltage on the second output conductor.

12. The resonance-based DC-DC converter of claim 11 wherein the control circuitry controls the fourth, fifth, and third switches in accordance with the first, second, and third phases, wherein the first, second, and third phases are non-overlapping.

13. The resonance-based DC-DC converter of claim 12 wherein the control circuitry closes the fourth and third switches and opens the fifth switch during the first phase, closes the fifth switch and opens the fourth and third switches during the second phase, and causes the fourth switch to remain open, opens the fifth switch, and closes the third switch during the third phase.

14. The resonance-based DC-DC converter of claim 13 wherein the control circuitry includes a second comparator for detecting when the second output voltage is less than a minimum level representative of a second reference voltage to generate a first level of a second signal which causes the control circuitry to control the fourth, fifth, and third switches so as to cause the inductor current to charge a second load connected to the second output conductor, the second comparator also detecting when the second output voltage is greater than a maximum level representative of the second reference voltage to generate a second level of the second signal which causes the control circuitry to control the fourth, fifth, and third switches so as to prevent the inductor current from further charging the second load.

15. The resonance-based DC-DC converter of claim 1 including a boosting transistor coupled between the resonance conductor and the first reference voltage and also including a second boosting transistor coupled between the resonance conductor and a second output conductor for producing a boosted output voltage on the second output conductor.

16. A method for converting a DC input voltage to a DC output voltage on an output conductor by means of a resonance-based DC-DC converter, the method comprising:
   (a) coupling a first terminal of an inductor directly to a source of the DC input voltage, coupling a second terminal of the inductor to a resonance conductor, and coupling a first terminal of a resonance capacitor to the resonance conductor;
   (b) conducting inductor current from the resonance conductor through a first switch into the output conductor during a first phase;

(c) conducting inductor current through the resonance capacitor and a second switch and into the output conductor during a second phase; and (d) conducting inductor current from a source of a first reference voltage through a third switch, through the resonance capacitor, and through the inductor into the source of the input voltage during a third phase.

17. The method of claim 16 including closing the first and third switches and opening the second switch during the first phase, closing the second switch and opening the first and third switches during the second phase, and causing the first switch to remain open, opening the second switch, and closing the third switch during the third phase.

18. The method of claim 17 including detecting when the output voltage on the output conductor is less than a minimum level representative of a second reference voltage and, in response to the detecting, generating a first level of a signal and controlling the first, second, and third switches in response to the signal so as to cause the inductor current to charge a load connected to the output conductor, and also detecting when the output voltage is greater than a maximum level representative of the second reference voltage, and, in response to that detecting, generating a second level of the signal and controlling the first, second, and third switches in response to that detecting so as to prevent the inductor current from further charging the load.

19. The method of claim 17 including detecting zero-crossing occurrences of the inductor current and, in response to that detecting, determining times at which the first and third switches need to be closed and times at which the second switch needs to be open.

20. The method of claim 17 including comparing the output voltage with a minimum level of a resonance voltage of the resonance conductor to generate a difference signal representative of a difference between the output voltage and the minimum level of the resonance voltage, and converting the difference signal to a time duration during which the first switch is closed during the first phase.

21. A circuit for converting a DC input voltage to a first DC output voltage on a first output conductor by means of a resonance-based DC-DC converter, comprising:
(a) means for coupling a first terminal of an inductor directly to a source of the DC input voltage, means for coupling a second terminal of the inductor to a resonance conductor, and means for coupling a first terminal of a resonance capacitor to the resonance conductor;
(b) means for conducting inductor current from the resonance conductor through a first switch into the first output conductor during a first phase;
(c) means for conducting inductor current through the resonance capacitor and a second switch and into the first output conductor during a second phase; and
(d) means for conducting inductor current from a source of the first reference voltage through a third switch, through the resonance capacitor, and through the inductor into the source of the input voltage during the third phase.

\* \* \* \* \*